(12) United States Patent
Fujimura

(10) Patent No.: US 12,032,148 B2
(45) Date of Patent: Jul. 9, 2024

(54) MICROSCOPE SLIDE, METHOD FOR MANUFACTURING MICROSCOPE SLIDE, OBSERVATION METHOD, AND ANALYSIS METHOD

(71) Applicant: Hitachi High-Tech Corporation, Tokyo (JP)

(72) Inventor: Toru Fujimura, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 902 days.

(21) Appl. No.: 17/047,097

(22) PCT Filed: Apr. 17, 2018

(86) PCT No.: PCT/JP2018/015800
§ 371 (c)(1),
(2) Date: Oct. 13, 2020

(87) PCT Pub. No.: WO2019/202650
PCT Pub. Date: Oct. 24, 2019

(65) Prior Publication Data
US 2021/0149172 A1  May 20, 2021

(51) Int. Cl.
*C03C 15/00* (2006.01)
*C03C 17/23* (2006.01)
(Continued)

(52) U.S. Cl.
CPC .............. *G02B 21/34* (2013.01); *C03C 15/00* (2013.01); *C03C 17/23* (2013.01); *C03C 17/30* (2013.01);
(Continued)

(58) Field of Classification Search
CPC .......... C03C 15/00; C03C 17/23; C03C 17/30; C03C 2217/231; C03C 2217/76; C03C 2217/948
See application file for complete search history.

(56) References Cited

U.S. PATENT DOCUMENTS

2010/0308204 A1   12/2010  Taniguchi
2011/0076448 A1*   3/2011  Agarwal ................ B82Y 40/00
                                                                  427/282
(Continued)

FOREIGN PATENT DOCUMENTS

JP          50-7451 U     1/1975
JP          51-98551 U    8/1976
(Continued)

OTHER PUBLICATIONS

Wikipedia, "Glass" via https://en.wikipedia.org/wiki/Glass ; pp. 1-26 (Year: 2023).*
(Continued)

*Primary Examiner* — Binh X Tran
(74) *Attorney, Agent, or Firm* — Crowell & Moring LLP

(57) ABSTRACT

It is not preferable to use a material other than materials that are used in the related art in order to prevent a section from peeling from a microscope slide. This is because, even if adhesiveness is improved, it is necessary to eliminate influence on processes such as dyeing. An object of the invention is to provide a technique for preventing a section from peeling off without applying an additional material. In the invention, the above-described problem is solved by etching at least a part of a region of a surface of a substrate with reactive ions.

9 Claims, 19 Drawing Sheets

(51) Int. Cl.
*C03C 17/30* (2006.01)
*G01N 1/28* (2006.01)
*G02B 21/34* (2006.01)

(52) U.S. Cl.
CPC ......... *G01N 1/28* (2013.01); *C03C 2217/231* (2013.01); *C03C 2217/76* (2013.01); *C03C 2217/948* (2013.01)

(56) References Cited

U.S. PATENT DOCUMENTS

| | | | |
|---|---|---|---|
| 2013/0053281 A1* | 2/2013 | Zarrine-Afsar | B01L 3/5085 506/40 |
| 2013/0069272 A1 | 3/2013 | Ootera et al. | |
| 2013/0280890 A1* | 10/2013 | Lei | H01L 21/67207 156/345.1 |
| 2014/0202986 A1* | 7/2014 | Renaldo | G03F 7/24 216/41 |
| 2016/0168021 A1 | 6/2016 | Goh et al. | |
| 2018/0250670 A1* | 9/2018 | Le Berre | B01L 3/5088 |
| 2018/0318467 A1* | 11/2018 | Esplin | A61L 27/047 |
| 2020/0232891 A1 | 7/2020 | Sawaguchi et al. | |
| 2021/0149172 A1 | 5/2021 | Fujimura | |

FOREIGN PATENT DOCUMENTS

| | | |
|---|---|---|
| JP | 10-333051 A | 12/1998 |
| JP | 2007-107969 A | 4/2007 |
| JP | 2007-328038 A | 12/2007 |
| JP | 2009-31688 A | 2/2009 |
| JP | 2009-36970 A | 2/2009 |
| JP | 2010-63430 A | 3/2010 |
| JP | 2011-56775 A | 3/2011 |
| JP | 2012-229995 A | 11/2012 |
| JP | 2013-63576 A | 4/2013 |
| JP | 2014-144639 A | 8/2014 |
| JP | 2014-175376 A | 9/2014 |
| JP | 2015-227904 A | 12/2015 |
| JP | 2016-118635 A | 6/2016 |
| JP | 2016-528149 A | 9/2016 |
| JP | 2016-197134 A | 11/2016 |
| JP | 2016-198059 A | 12/2016 |
| WO | WO-2016090407 A1 * | 6/2016 ........ B01L 3/502746 |
| WO | WO-2017042115 A1 * | 3/2017 ............ B01L 3/5088 |
| WO | WO 2018/084285 A1 | 5/2018 |
| WO | WO 2019/082293 A1 | 5/2019 |
| WO | WO 2019/202650 A1 | 10/2019 |

OTHER PUBLICATIONS

Wikipedia, "Quartz" via https://en.wikipedia.org/wiki/Quartz ; pp. 1-20 (Year: 2023).*
International Search Report (PCT/ISA/210) issued in PCT Application No. PCT/JP2019/040686 dated Dec. 24, 2019 with English translation (eight (8) pages).
Japanese-language Written Opinion (PCT/ISA/237) issued in PCT Application No. PCT/JP2019/040686 dated Dec. 24, 2019 (seven (7) pages).
Sawaguchi, Akira, et al., "Informative three-dimensional survey of cell/tissue architectures in thick paraffin sections by simple low-vacuum scanning electron microscopy", Scientific Reports, May 10, 2018, vol. 8, Article No. 7479, pp. 1-11 (eleven (11) pages).
U.S. Appl. No. 17/766,962, filed Apr. 6, 2022.
International Search Report (PCT/ISA/210) issued in PCT Application No. PCT/JP2018/015800 dated Jul. 10, 2018 with English translation (four (4) pages).
Japanese-language Written Opinion (PCT/ISA/237) issued in PCT Application No. PCT/JP2018/015800 dated Jul. 10, 2018 (six (6) pages).
Fujimura et al., "Morphology and Photonic Band Structure Modification of Polystyrene Particle Layers by Reactive Ion Etching", Applied Physics Letters, Mar. 12, 2001, pp. 1478-1480, vol. 78, No. 11, (three (3) pages).
Japanese-language Office Action issued in Japanese Application No. 2020-514816 dated Sep. 28, 2021 with English translation (eight (8) pages).
International Search Report (PCT/ISA/210) issued in PCT Application No. PCT/JP2019/040686 dated Dec. 24, 2019 with English translation (nine (9) pages).
Japanese-language Written Opinion (PCT/ISA/237) issued in PCT Application No. PCT/JP2019/040686 dated Dec. 24, 2019 with English translation (11 pages).

* cited by examiner

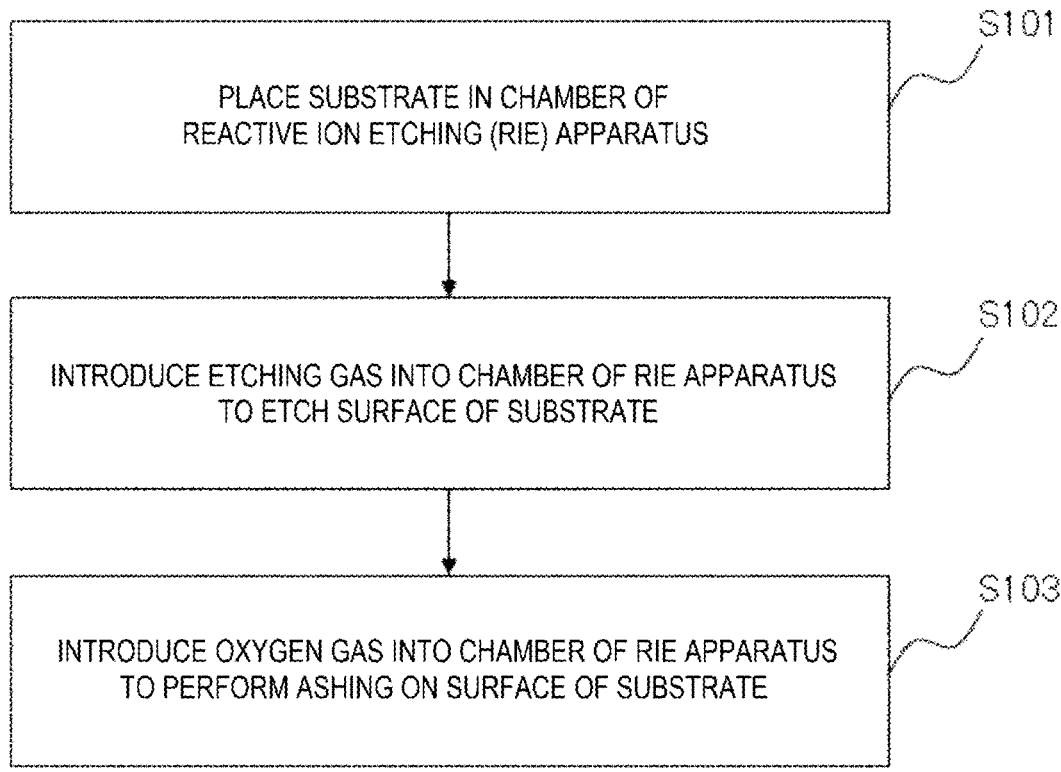
[FIG. 1]
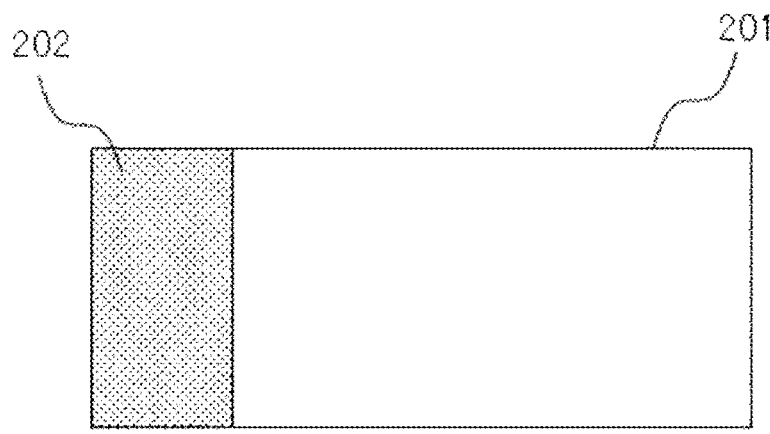
[FIG. 2]

[FIG. 3]
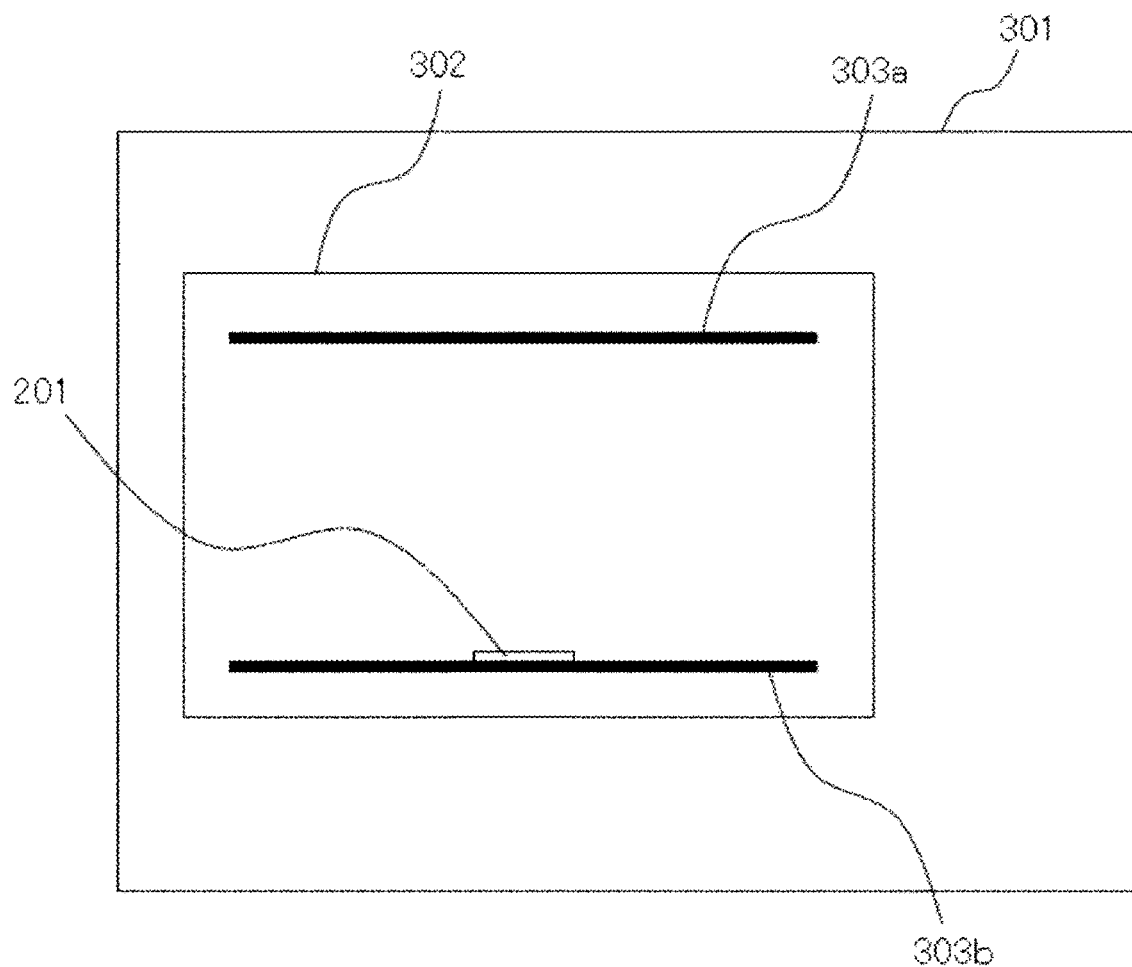
[FIG. 4]
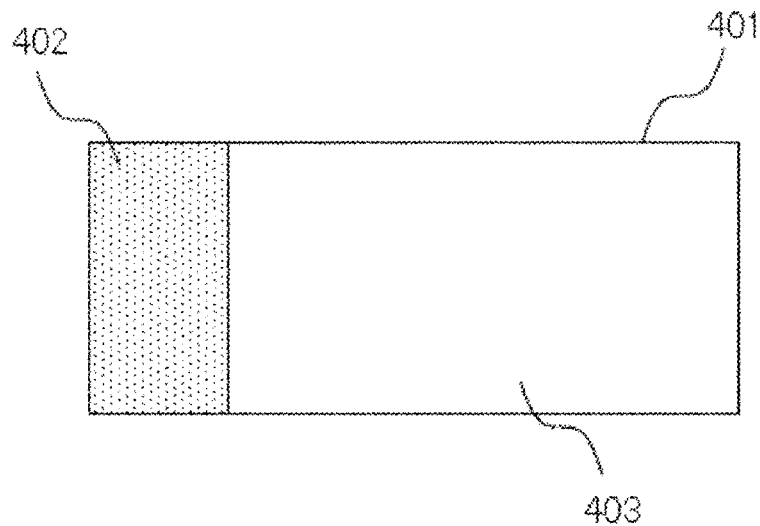

[FIG. 5]
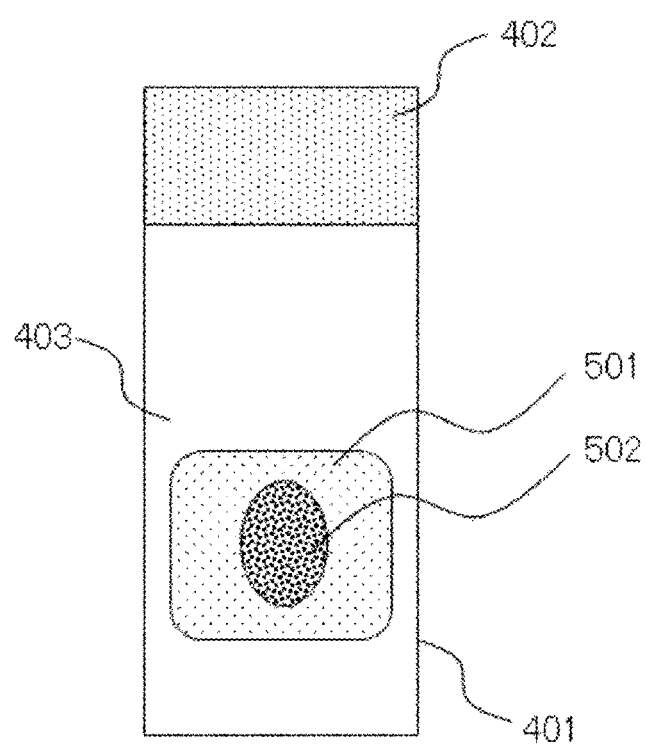

[FIG. 6]
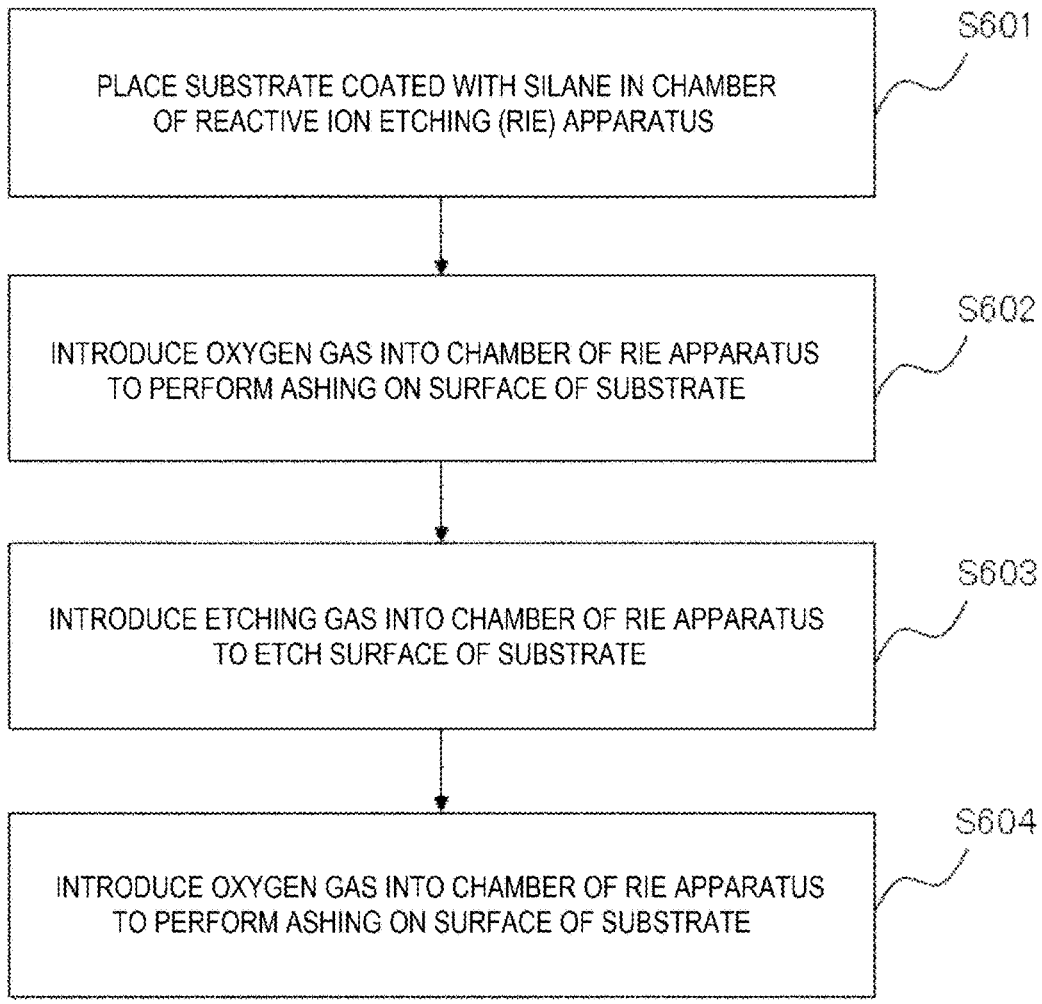
[FIG. 7]
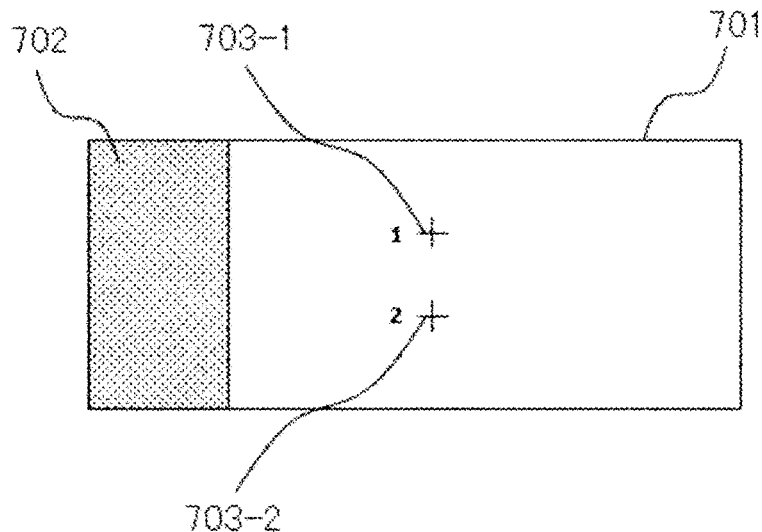

[FIG. 8]
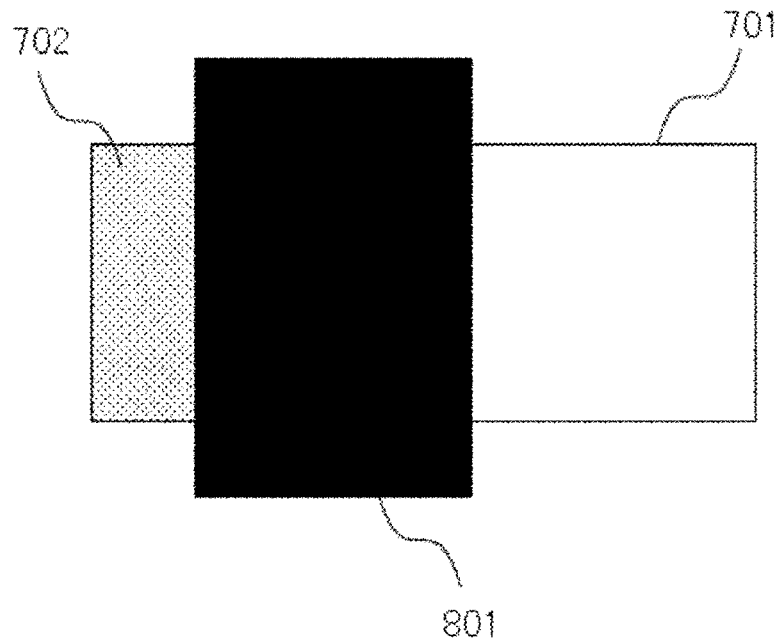
[FIG. 9]
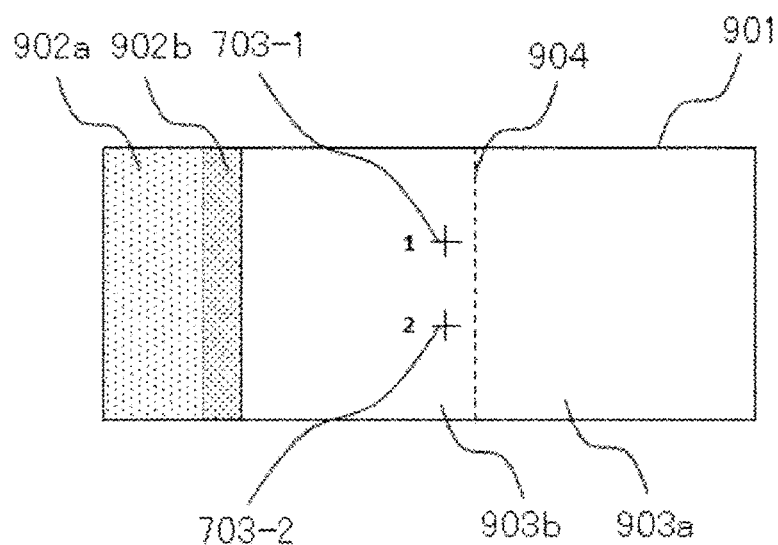

[FIG. 10]
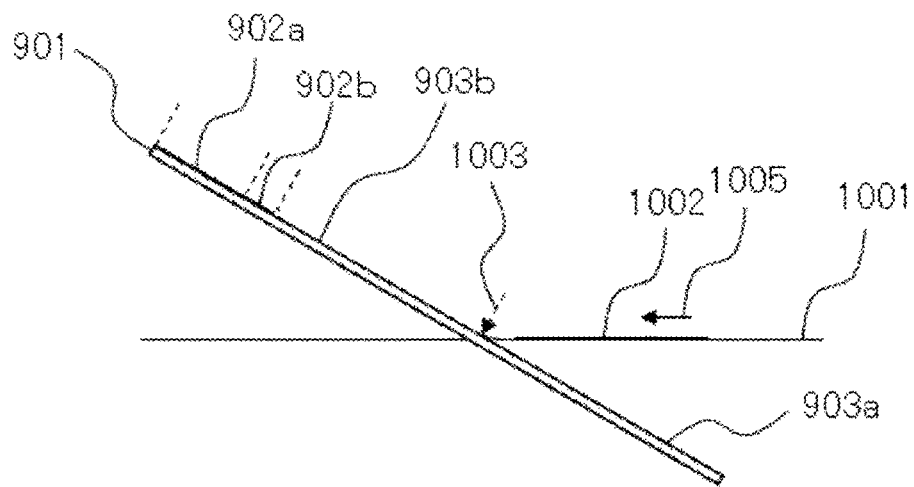
[FIG. 11]
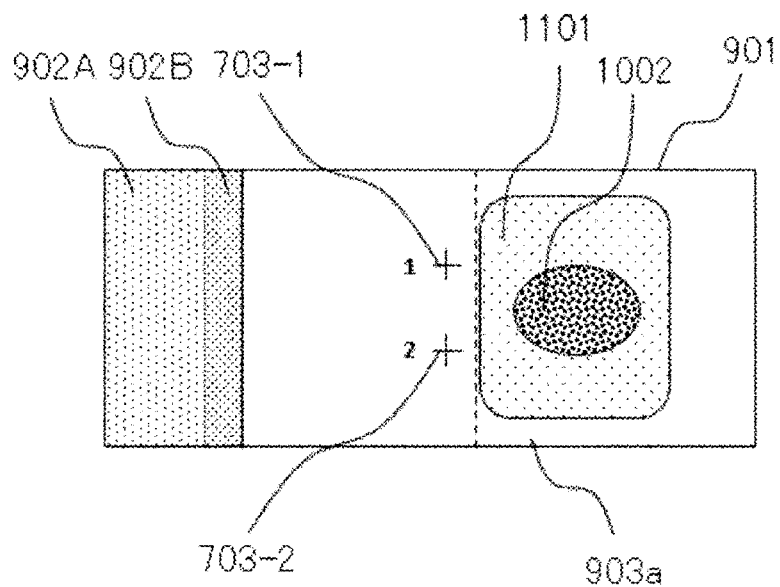

[FIG. 12]
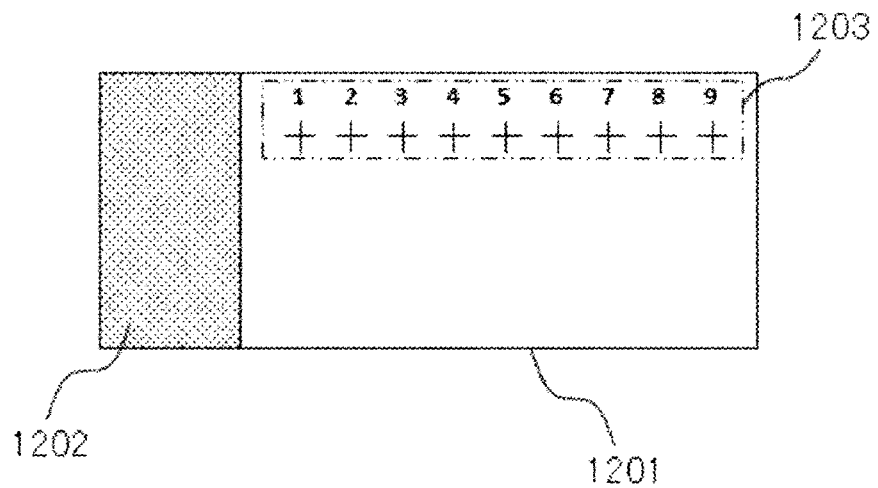
[FIG. 13]
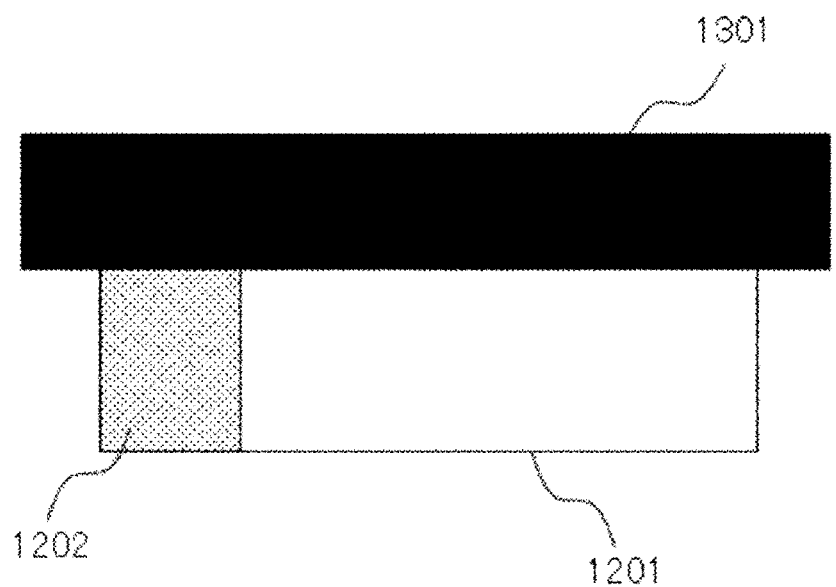

[FIG. 14]
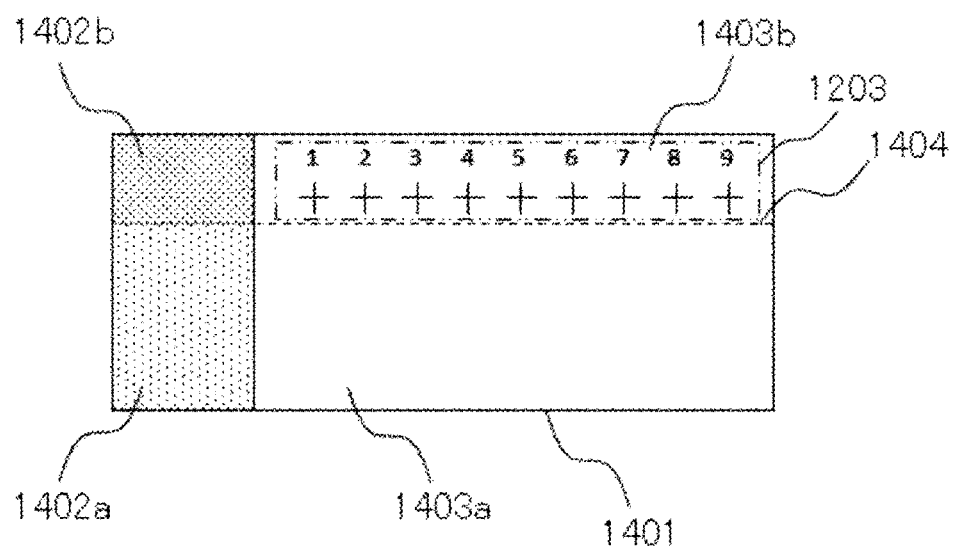
[FIG. 15]
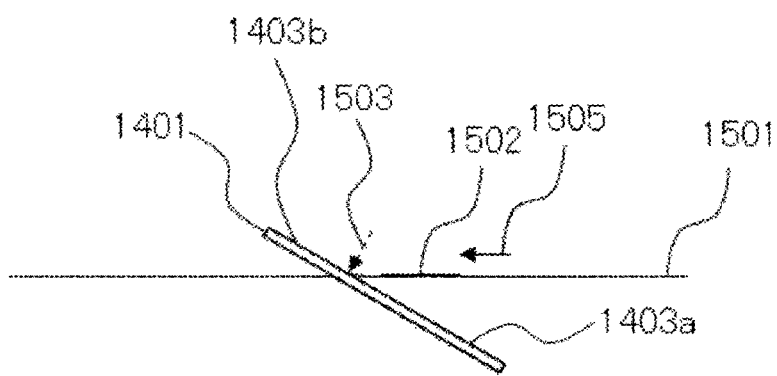

[FIG. 16]
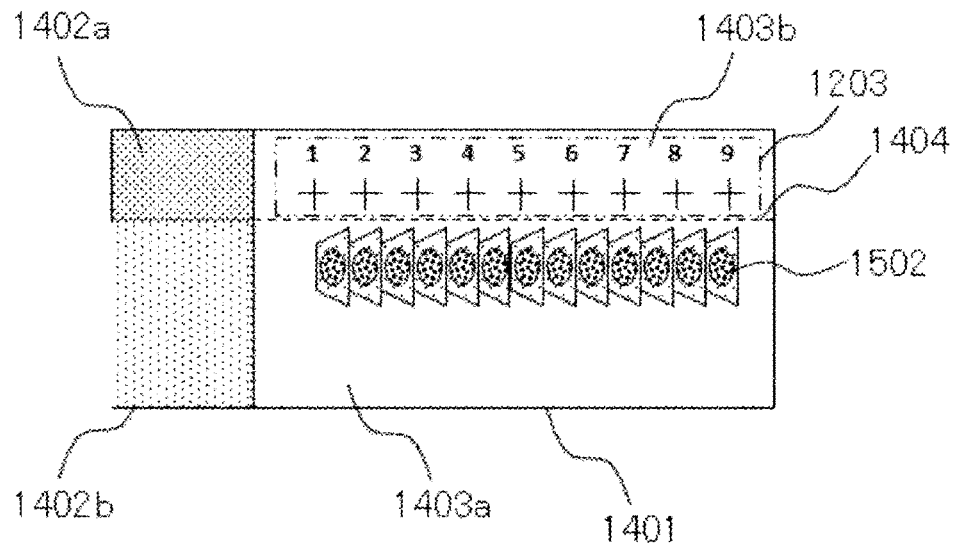
[FIG. 17A]
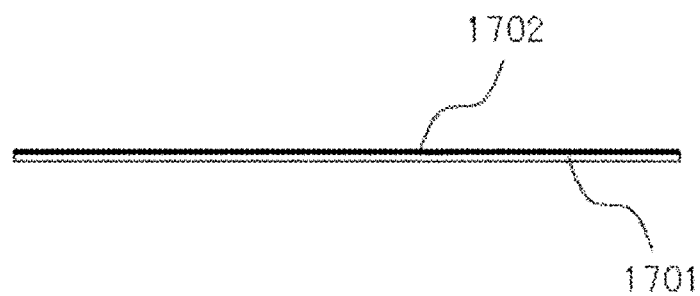
[FIG. 17B]
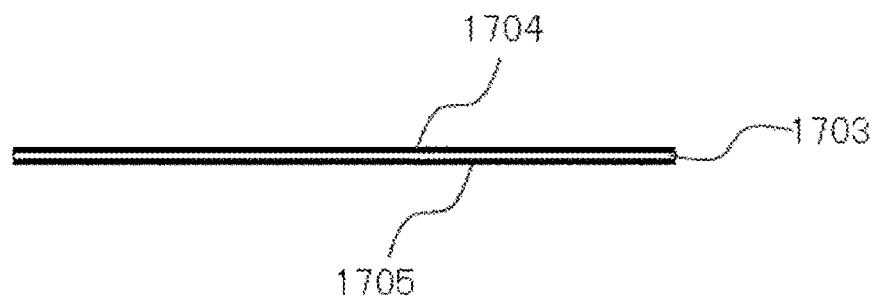

[FIG. 18]
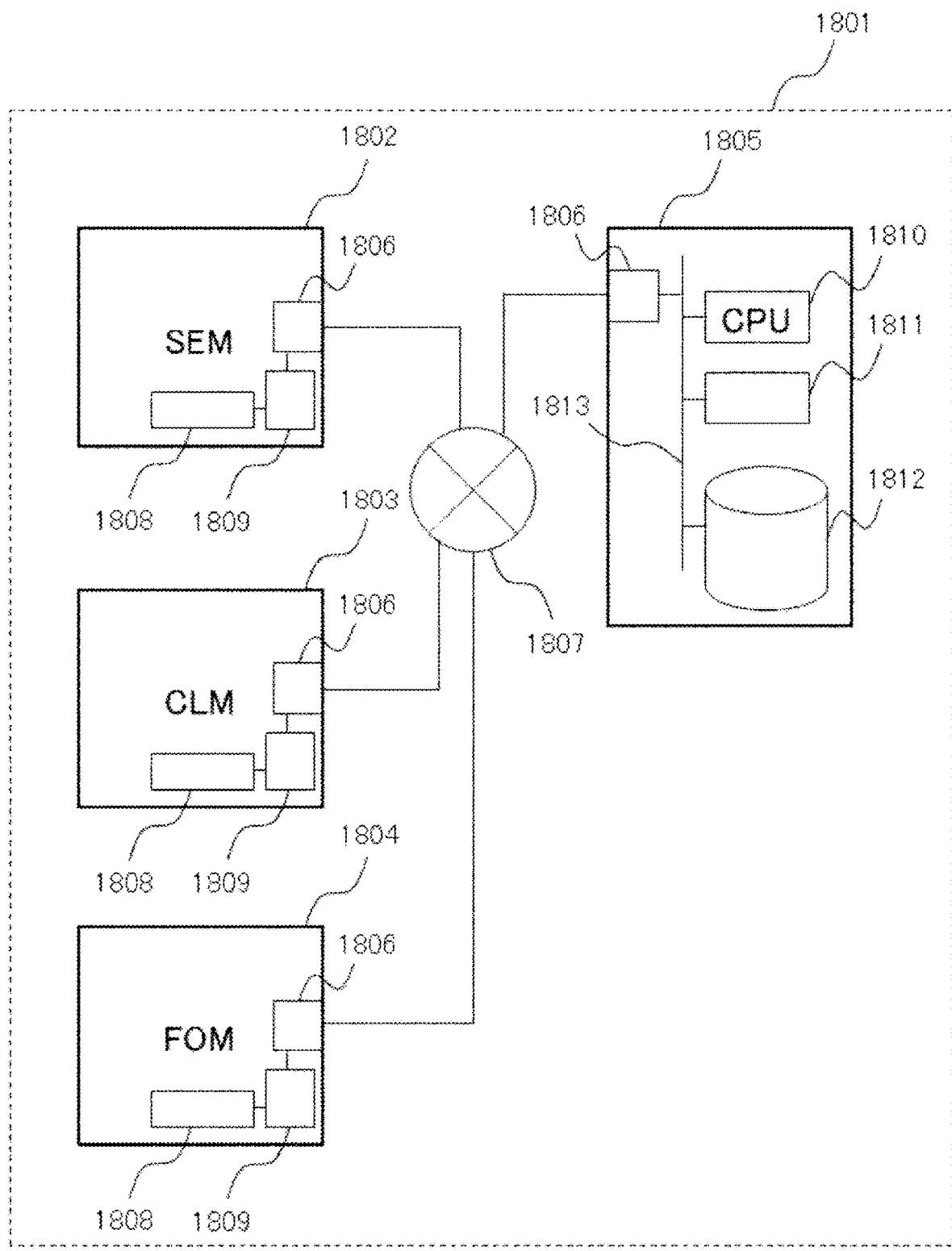

[FIG. 19A]
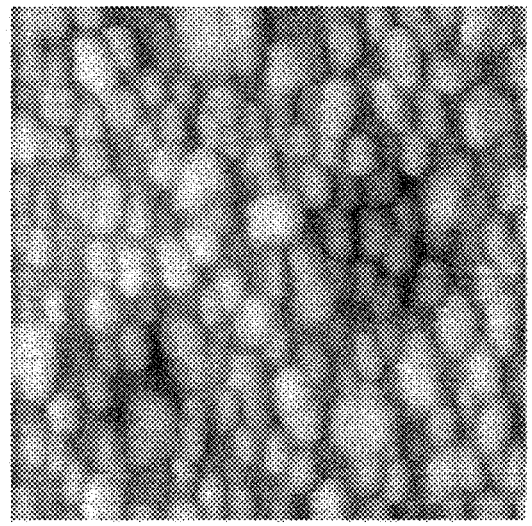
[FIG. 19B]
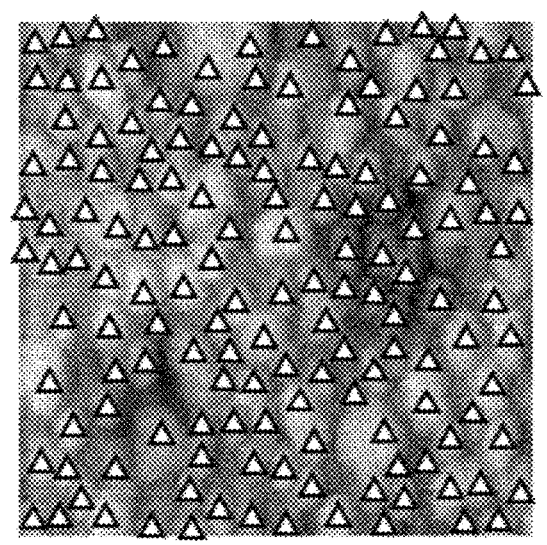

[FIG. 19C]
[FIG. 20]
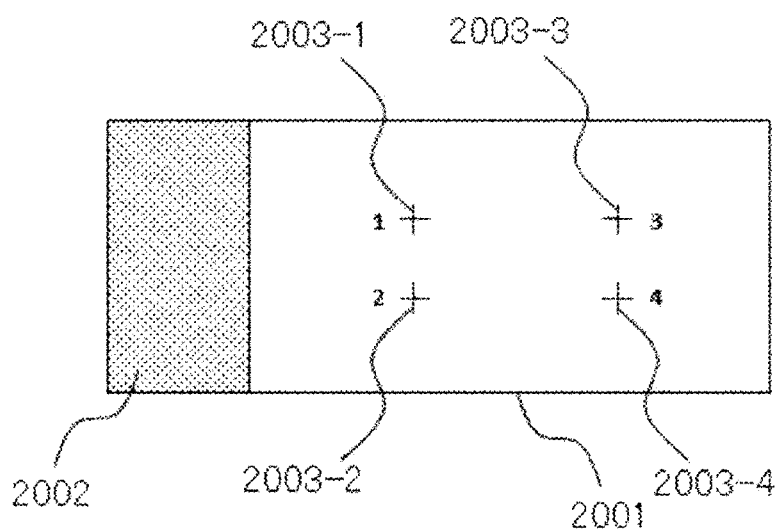

[FIG. 21]
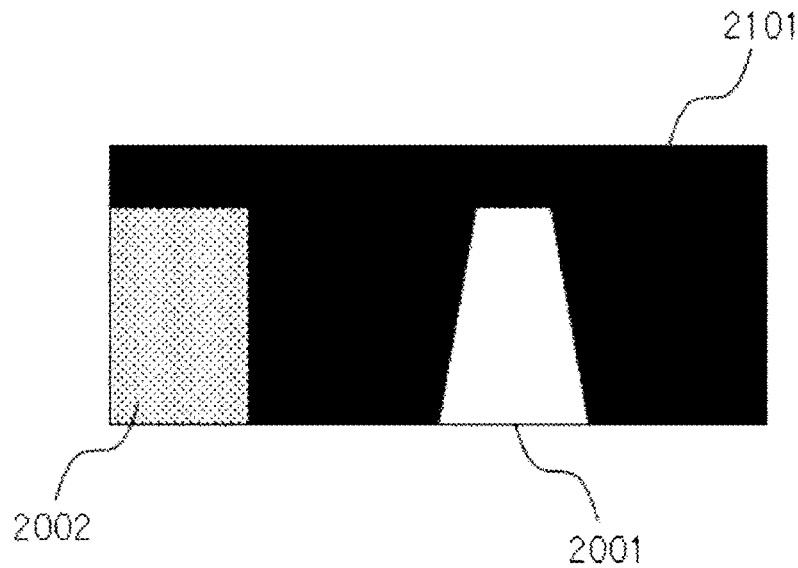
[FIG. 22]
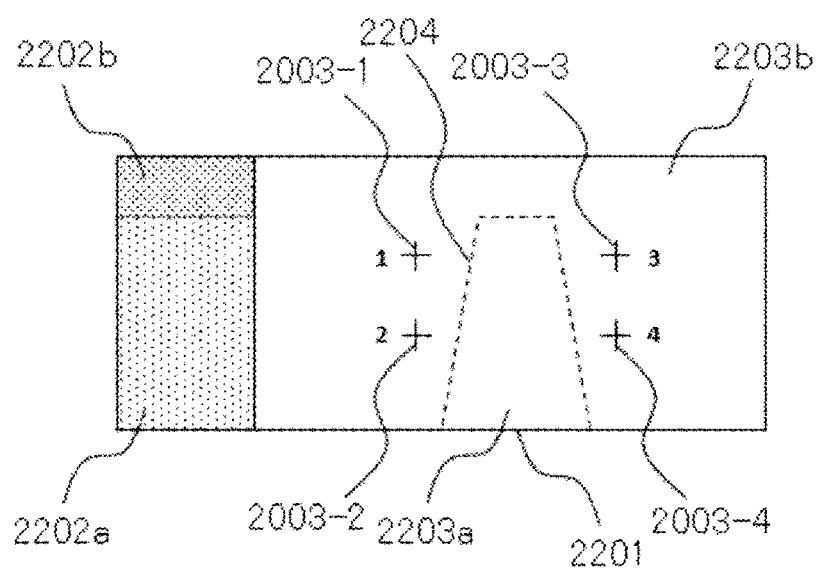

[FIG. 23]
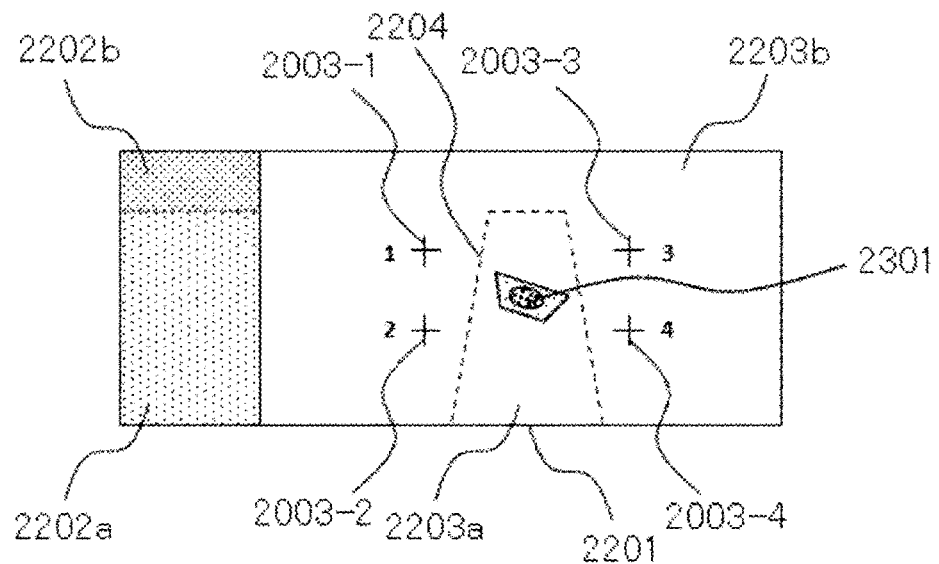
[FIG. 24]
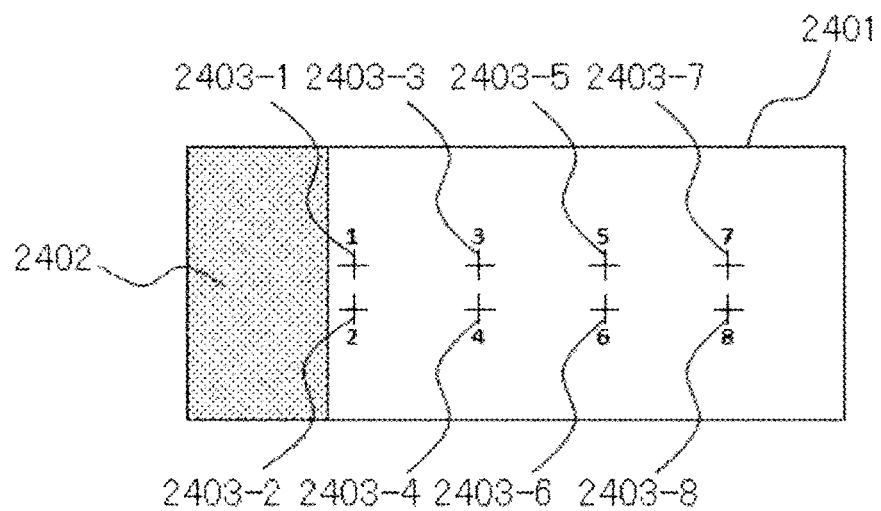

[FIG. 25]
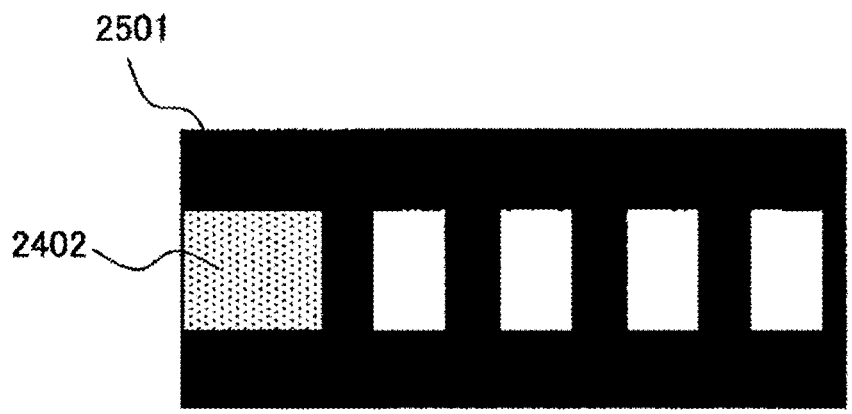
[FIG. 26]
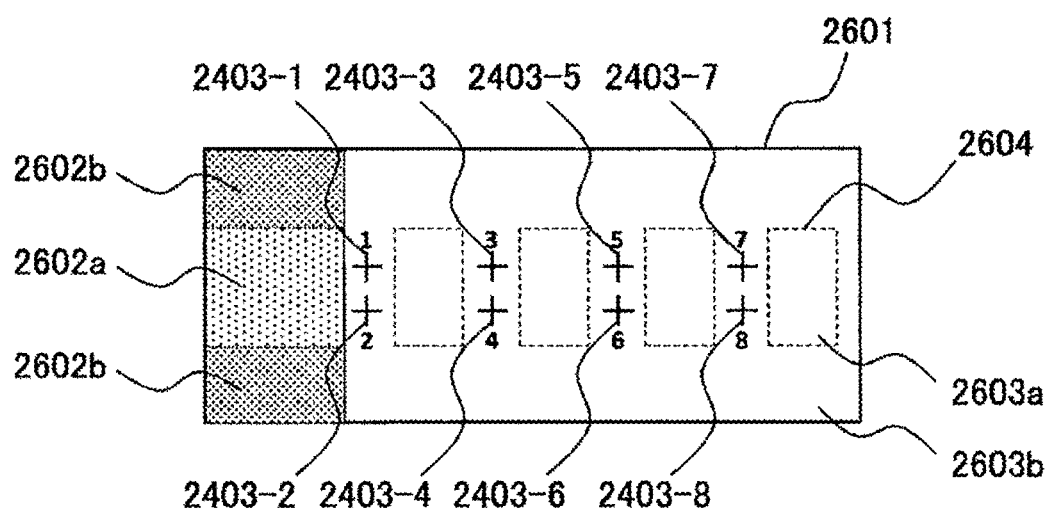

[FIG. 27]
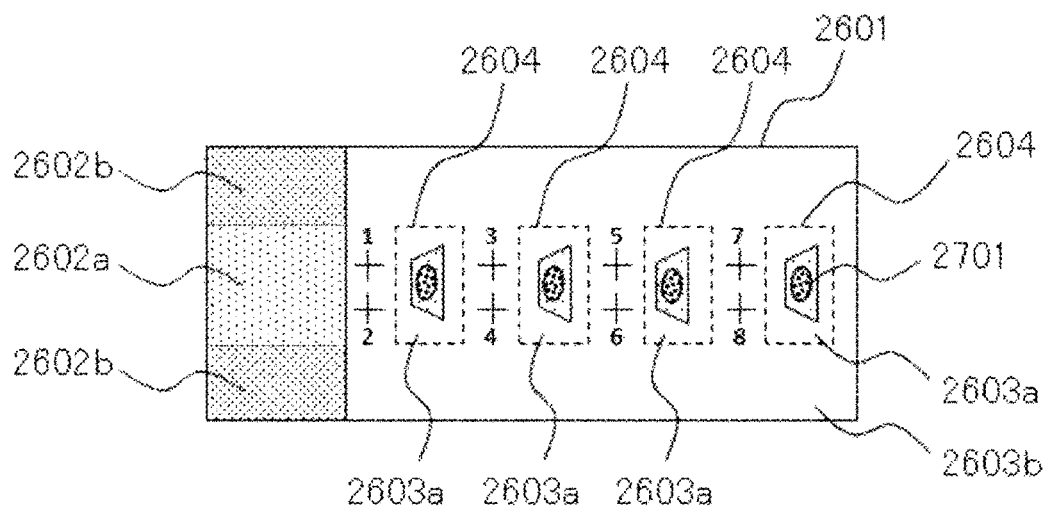
[FIG. 28]
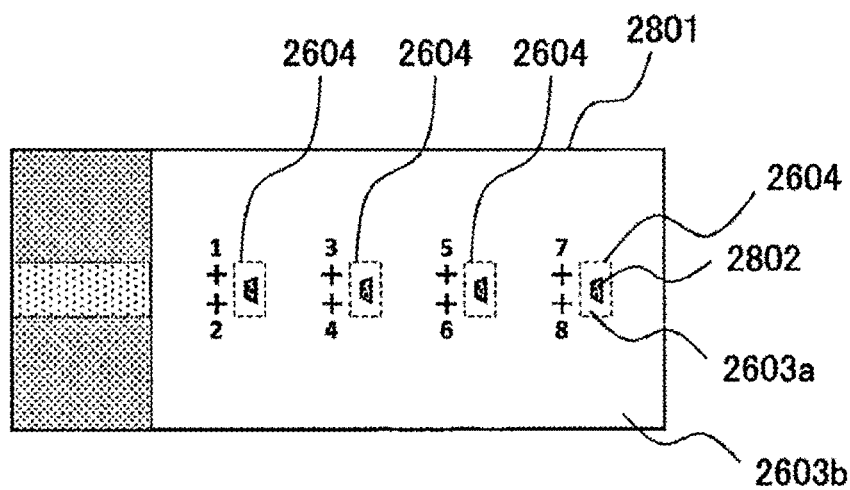

[FIG. 29]
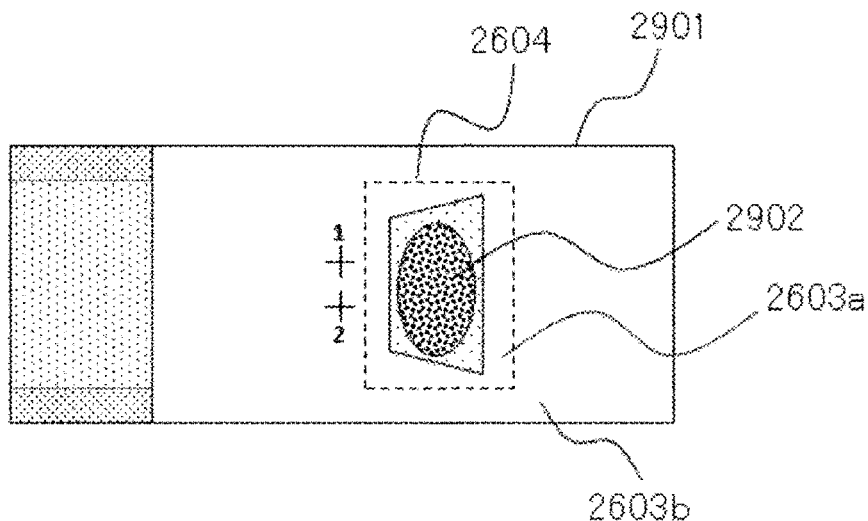
[FIG. 30]
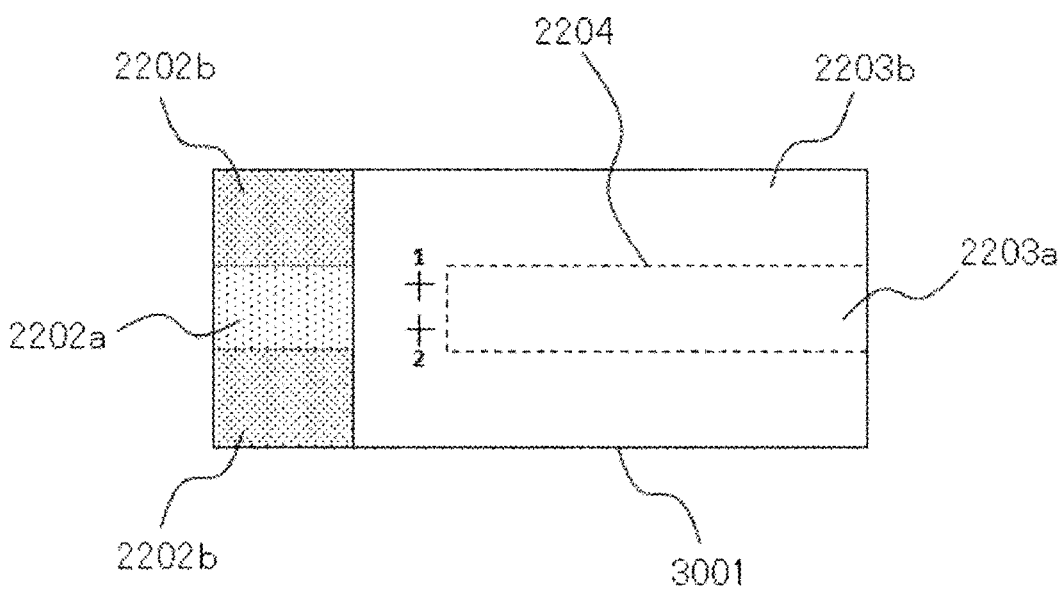

[FIG. 31A]
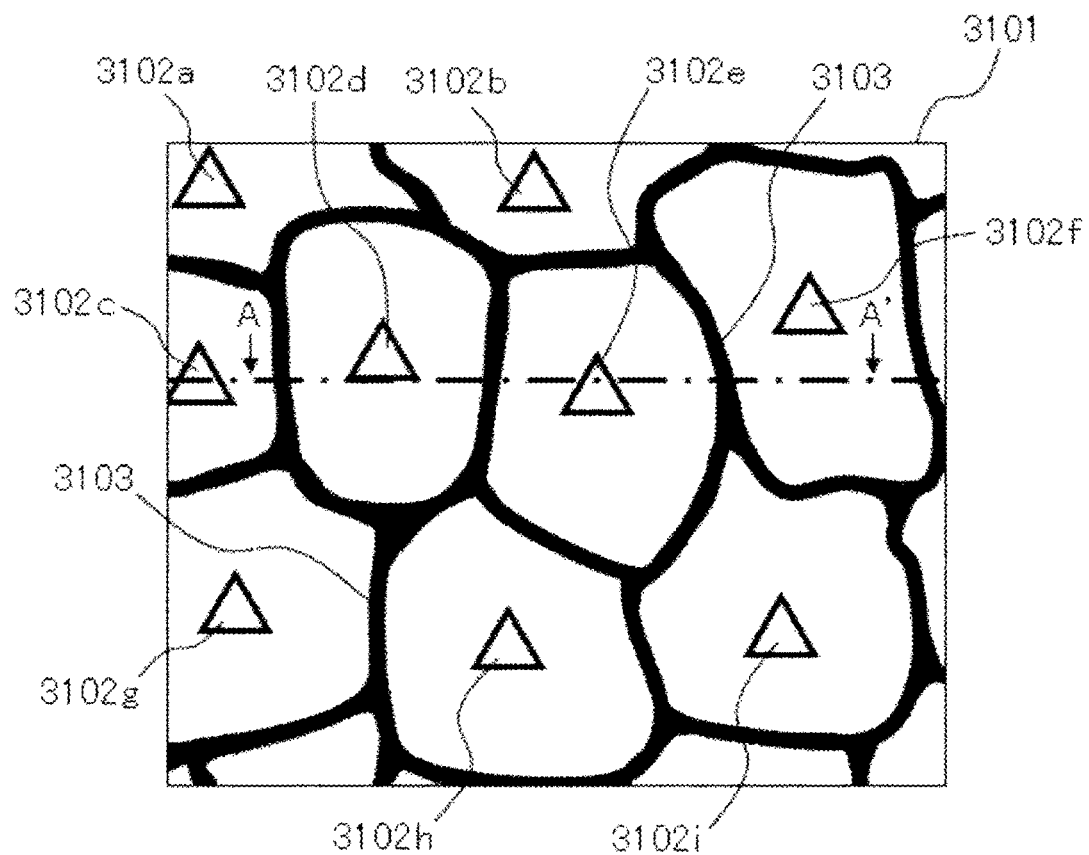
[FIG. 31B]
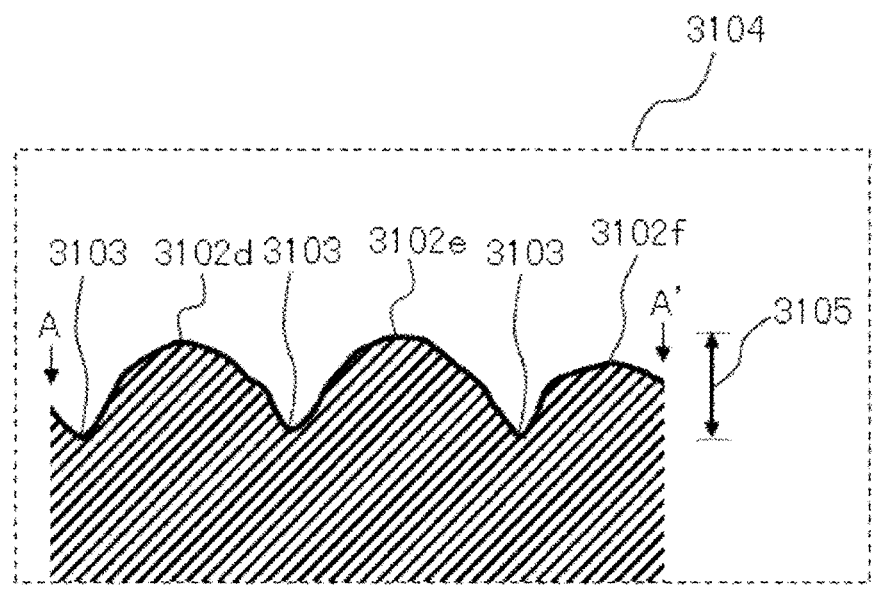

[FIG. 32]
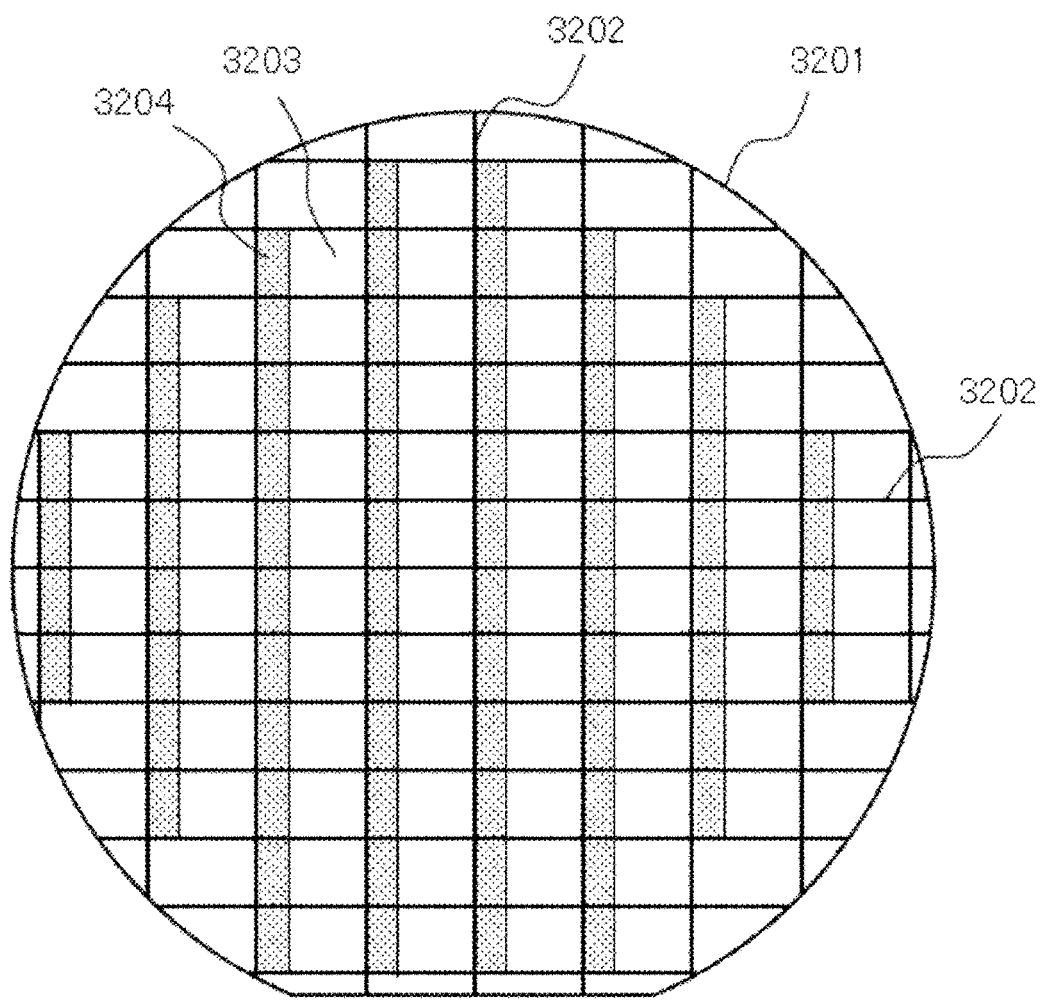

MICROSCOPE SLIDE, METHOD FOR MANUFACTURING MICROSCOPE SLIDE, OBSERVATION METHOD, AND ANALYSIS METHOD

TECHNICAL FIELD

The present invention relates to a microscope slide, a method for manufacturing a microscope slide, an observation method, and an analysis method.

BACKGROUND ART

In a related art, a silane coating is applied to a glass slide, so that the glass slide and a specimen section are not easily peeled. PTL 1 discloses a technique in which a specimen section positioning mark is printed on a transparent portion of a glass slide excluding a frosted portion, and a specimen section is placed on the glass slide based on this specimen section positioning mark. PTL 1 shows that a silane coating is applied to the glass slide, so that the specimen section is not easily peeled off.

Non-Patent Document 1 discloses that by performing reactive ion etching, a structure having random unevenness of 10 nanoscale is introduced on a surface of submicron-sized polystyrene particles.

CITATION LIST

Patent Literature

PTL 1: JP-A-10-333051

Non-Patent Literature

Non-patent document 1: Toru Fujimura et al., "Morphology and photonic band structure modification of polystyrene particle layers by reactive ion etching", Applied Physics Letters, March 2001, Vol. 78, No. 11, pp. 1478-1480.

SUMMARY OF INVENTION

Technical Problem

It is not preferable to use a material other than materials that are used in the related art in order to prevent a section from peeling from a microscope slide. This is because, even if adhesiveness is improved, it is necessary to eliminate influence on processes such as dyeing.

An object of the invention is to provide a technique for preventing a section from peeling off without applying an additional material.

Solution to Problem

By introducing a structure same as the unevenness introduced on the surface of the polystyrene particles shown in Non-Patent Document 1 to the surface of the microscope slide, the inventor attempted to improve adhesiveness of the sections and succeeded in attaining good adhesiveness.

In the invention, the above-described problem is solved by etching at least a part of a region of a surface of a substrate with reactive ions.

Advantageous Effect

According to the invention, a technique for preventing a section from peeling off can be provided.

BRIEF DESCRIPTION OF DRAWINGS

FIG. 1 is a flow chart of a manufacturing method of a microscope slide according to an embodiment of the invention.

FIG. 2 is a diagram showing a glass slide prepared according to a first embodiment of the invention.

FIG. 3 is a diagram showing a reactive ion etching apparatus used according to the embodiment of the invention.

FIG. 4 is a diagram showing a microscope slide according to the first embodiment of the invention.

FIG. 5 is a diagram showing a use state of the microscope slide according to the first embodiment of the invention.

FIG. 6 is a flow chart of the manufacturing method of a microscope slide according to the embodiment of the invention.

FIG. 7 is a diagram showing a glass slide prepared according to a second embodiment of the invention.

FIG. 8 is a diagram showing a manufacturing process for a microscope slide according to the second embodiment of the invention.

FIG. 9 is a diagram showing the microscope slide according to the second embodiment of the invention.

FIG. 10 is a diagram showing a use state of the microscope slide according to the second embodiment of the invention.

FIG. 11 is a diagram showing a use state of the microscope slide according to the second embodiment of the invention.

FIG. 12 is a diagram showing a glass slide prepared according to a third embodiment of the invention.

FIG. 13 is a diagram showing a manufacturing process for a microscope slide according to the third embodiment of the invention.

FIG. 14 is a diagram showing the microscope slide according to the third embodiment of the invention.

FIG. 15 is a diagram showing a use state of the microscope slide according to the third embodiment of the invention.

FIG. 16 is a diagram showing a use state of the microscope slide according to the third embodiment of the invention.

FIG. 17A is a diagram showing a substrate prepared according to a fourth embodiment of the invention.

FIG. 17B is a diagram showing a substrate prepared according to a modification of the fourth embodiment of the invention.

FIG. 18 is a diagram showing an observation system according to an embodiment of the invention.

FIG. 19A shows an atomic force microscope image on a surface of the microscope slide according to the embodiment of the invention.

FIG. 19B is a diagram in which triangular marks are put on convex portions of the atomic force microscope image on the surface of the microscope slide according to the embodiment of the invention.

FIG. 19C is an atomic force microscope image on the surface of the glass slide before reactive ion etching treatment is performed according to the embodiment of the invention.

FIG. 20 is a diagram showing a glass slide prepared according to a sixth embodiment of the invention.

FIG. 21 is a diagram showing a manufacturing process for a microscope slide according to the sixth embodiment of the invention.

FIG. 22 is a diagram showing the microscope slide according to the sixth embodiment of the invention.

FIG. 23 is a diagram showing a use state of the microscope slide according to the sixth embodiment of the invention.

FIG. 24 is a diagram showing a substrate prepared according to a seventh embodiment of the invention.

FIG. 25 is a diagram showing a manufacturing process for a microscope slide according to the seventh embodiment of the invention.

FIG. 26 is a diagram showing the microscope slide according to the seventh embodiment of the invention.

FIG. 27 is a diagram showing a use state of the microscope slide according to the seventh embodiment of the invention.

FIG. 28 is a diagram showing a use state of a microscope slide according to a modification of the seventh embodiment of the invention.

FIG. 29 is a diagram showing a use state of the microscope slide according to the modification of the seventh embodiment of the invention.

FIG. 30 is a diagram showing a microscope slide according to a modification of the sixth embodiment of the invention.

FIG. 31A is a schematic view showing an example of unevenness introduced on the surface of the microscope slide according to the invention.

FIG. 31B is a schematic view of a cross section taken along a one-dot chain line in FIG. 31(a).

FIG. 32 is a diagram showing a manufacturing method of a microscope slide according to a modification of the first embodiment of the invention.

DESCRIPTION OF EMBODIMENTS

In the following embodiments, description may be divided into a plurality of sections or embodiments if necessary for convenience. Unless particularly specified, the sections or embodiments are not independent of each other, but have a relationship in which one section or embodiment is a modification, detailed description, supplementary description, or the like of a part or all of another section or embodiment.

In the drawings used in the following embodiments, even a plan view may be hatched in order to make the drawings easy to be seen. In all the drawings showing the following embodiments, those having the same function are denoted by the same reference symbols in principle, and repeated description thereof will be omitted. Hereinafter, embodiments of the invention will be described in detail with reference to the drawings.

First Embodiment

FIG. 1 is a flow chart of a manufacturing method of a microscope slide according to the first embodiment of the invention. In the present embodiment, a glass slide 201 shown in FIG. 2 is prepared as a substrate. The glass slide 201 contains silicon dioxide as a main component. The glass slide 201 has a size in which a length is 76 mm, a width is 26 mm, and a thickness is 1 mm. The glass slide 201 includes a frosted portion 202 on one surface. The frost portion 202 is formed by printing resin frost, and is formed as a resin film containing a colorant and a frosting agent by performing, for example, color urethane printing. The frosted portion 202 is colored with the colorant, for example, is colored pink. The glass slide 201 is transparent except for the frosted portion 202.

FIG. 3 shows a schematic view of a reactive ion etching (RIE) apparatus 301 which is a parallel plate type dry etching apparatus used in the present embodiment. The RIE apparatus 301 introduces an etching gas after evacuating a chamber 302 to high vacuum, applies high-frequency power between parallel plates formed by an upper electrode 303a and a lower electrode 303b in the chamber 302 to generate plasma, and dry-etches an object on the lower electrode 303b.

In step S101 in FIG. 1, the glass slide 201 prepared as the substrate is placed in the chamber 302 of the RIE apparatus 301. Specifically, the glass slide 201 is placed so that a side not including the frosted portion 202 faces the lower electrode 303b. Accordingly, a side including the frosted portion 202 is dry-etched. In FIG. 3, only one glass slide 201 is placed in the chamber 302 for clarity of explanation, but a plurality of glass slides 201 can be placed in the chamber 302.

Next, in step S102, in order to etch the silicon dioxide, which is the main component of the glass slide 201, with reactive ions, a $CHF_3$ gas is introduced as the etching gas into the chamber 302 of the RIE apparatus 301, the high-frequency power is applied between the upper electrode 303a and the lower electrode 303b to generate the plasma, and a surface of the glass slide 201 is etched with the reactive ions. Reactive ion etching conditions are, for example, 0.6 W/cm$^2$ and 13 Pa, and an etching time can be 1 minute. A shape of unevenness introduced as surface roughness on the surface of the glass slide 201 obtained by performing reactive ion etching can be controlled based on the reactive ion etching conditions. For example, in the example of introducing the above-described $CHF_3$ gas, by increasing the etching time, the surface roughness can be increased and the unevenness can be increased. On the contrary, by shortening the etching time, the surface roughness can be reduced and the unevenness can be reduced. At this time, in order to cause the unevenness introduced as the surface roughness on the surface of the glass slide 201 obtained by performing the reactive ion etching to be sufficiently finer than a wavelength of visible light, it is desirable to set a condition under which the silicon dioxide is etched with an average depth of less than 0.4 µm shorter than the wavelength of the visible light. For example, a condition can be set under which the silicon dioxide is etched in a depth direction with an average depth of approximately 0.1 µm from a position of the surface of the glass slide 201 before being etched. By causing the unevenness introduced as the surface roughness on the surface of the glass slide 201 obtained by performing the reactive ion etching to be sufficiently finer than the wavelength of the visible light, the unevenness can be made at a level that does not affect at least ordinary observation with an optical microscope. When observation with an apparatus having a high resolution such as a scanning electron microscope (SEM) is used, it is desirable to reduce the surface roughness and to reduce the introduced unevenness. Here, in the manufacturing method of the microscope slide according to the present embodiment, by changing the reactive ion etching conditions in step S102 depending on spatial resolution of a microscope used to observe a section, a size of the introduced unevenness can be changed. For example, as the spatial resolution of the microscope used to observe the section increases, the etching time of the reactive ion etching in step S102 becomes shorter, so that the surface roughness is reduced and the introduced unevenness is reduced. The shape of the unevenness introduced as the surface roughness can also be controlled by a type of a gas to be introduced, a pressure, or output of the reactive ion etching apparatus.

Next, in step S103, in order to remove a residue left on the surface of the glass slide 201, an oxygen gas is introduced into the chamber 302 of the RIE apparatus 301, the high-frequency power is applied between the upper electrode 303a and the lower electrode 303b to generate the plasma, and ashing is performed on the surface of the glass slide 201 etched in step S102. Ashing conditions in step S103 are, for example, the oxygen gas being introduced, 0.5 W/cm$^2$, and 40 Pa, and an ashing time can be set to 10 minutes.

As described above, the glass slide which is the microscope slide according to the present embodiment can be manufactured. FIG. 4 shows a glass slide 401 manufactured according to the present embodiment. In the glass slide 401 manufactured according to the present embodiment, as a result of etching with the reactive ions, the unevenness sufficiently finer than the wavelength of the visible light is introduced onto a surface 403 on a side where a frosted portion 402 is located. FIG. 19(a) shows anatomic force microscope image of a region of 1.556×1.556 μm$^2$ on the surface of the glass slide subjected to reactive ion etching treatment according to the present embodiment. It can be seen from FIG. 19(a) that the unevenness sufficiently finer than the wavelength of the visible light is introduced onto the surface. It can be known from FIG. 19(a) that a surface shape of the introduced unevenness is a surface shape of unevenness filled with convex portions. During the reactive ion etching in the step S102, on the surface of the glass slide 201, since the etching progresses more than the convex portions in regions between the adjacent convex portions, it is considered that grooves are formed between the adjacent convex portions, the formed grooves become recessed portions around each convex portion, and an surface shape of the unevenness filled with the convex portions is introduced onto the surface 403 of the glass slide 401. FIG. 19(b) shows an image obtained by superimposing triangular marks on positions that are considered to be the convex portions of the introduced fine unevenness with respect to the atomic force microscope image in FIG. 19(a). There are 151 convex portions marked with the triangular marks in FIG. 19(b) in the region of 1.556×1.556 μm$^2$.

FIG. 31(a) shows a schematic view 3101 of unevenness introduced onto the surface of the microscope slide according to the present embodiment. As shown in the schematic view 3101, on the surface of the microscope slide according to the present embodiment, a groove 3103 highlighted by a solid line is formed and surrounds each of convex portions 3102a to 3102i indicated by the triangular marks. FIG. 31(b) is a schematic view of a cross section taken along a one-dot chain line A-A' in FIG. 31(a). As shown in FIG. 31(b), the groove 3103 is separately formed between the adjacent convex portions 3102d and 3102e and between the adjacent convex portions 3102e and 3102f, and forms the recessed portion. Therefore, the surface shape of the unevenness introduced onto the surface of the microscope slide according to the present embodiment is the surface shape of the unevenness filled with the convex portions.

Thus, the surface shape of the unevenness filled with the convex portions can be obtained by performing the reactive ion etching treatment according to the present embodiment. A density of the introduced convex portions is preferably higher than 25 per μm$^2$ in a plan view. For visible light having a wavelength of 0.4 μm or more, a resolution limit of the optical microscope is approximately 0.2 μm. In the resolution limit of the optical microscope, when it is assumed that the convex portion has a size of 0.2 μm in a vertical direction and 0.2 μm in a lateral direction in the plan view, 25 convex portions are provided in 1 μm$^2$. Therefore, since the resolution limit of the optical microscope is exceeded by forming the convex portions at a density higher than 25 per μm$^2$ in the plan view, influence of the surface shape of the introduced unevenness on the observation with the optical microscope can be significantly reduced. With reference to the groove 3103 shown in FIG. 31(a), since the resolution limit of the optical microscope is exceeded by making an average area of regions including the convex portions surrounded by the groove 3103 in the plan view smaller than 0.04 μm$^2$, the influence of the surface shape of the introduced unevenness on the observation with the optical microscope can be significantly reduced. For example, the average area of the regions including the convex portions surrounded by the groove 3103 in the plan view is adjusted within a range of 0.00001 μm$^2$ to 0.03 μm$^2$ based on the above-described etching conditions. In a direction of the cross section shown in FIG. 31(b), by making an optical film thickness of an average thickness 3105 of unevenness corresponding to an average depth of the groove 3103 smaller than a quarter of 0.4 μm for visible light with a wavelength of 0.4 μm or more, influence of light interference effect can be reduced, and influence of the introduced unevenness on the observation with the optical microscope can be significantly reduced. Therefore, the average thickness 3105 of the unevenness is preferably 0.07 μm or less, with an average refractive index being 1.4. For example, the average thickness 3105 of the unevenness is adjusted in a range of 0.01 μm to 0.07 μm, for example, depending on the etching time of the etching conditions in step S102. FIG. 19(c) shows an atomic force microscope image of the region of 1.556×1.556 μm$^2$ on the surface of the glass slide before being subjected to the reactive ion etching treatment according to the present embodiment. Since the surface of the glass slide before being subjected to the reactive ion etching treatment according to the present embodiment is flat, it is not seen, in FIG. 19(c) the surface shape of the unevenness filled with the convex portions seen in FIG. 19(a).

The surface 403 etched with the reactive ions shows high hydrophilicity with a contact angle to water of approximately 10 degrees or less. Since the surface 403 shows the high hydrophilicity, it is easy to place a tissue section 502 embedded with a paraffin 501 on the surface 403 etched with the reactive ions as shown in FIG. 5. As a result of the above-described reactive ion etching treatment, the frosted portion 402 becomes less colored than the frosted portion 202 of the glass slide 201 prepared for manufacturing. Since the frosted portion 402 is lightly colored, it can be identified that the microscope slide is subjected to the above-described reactive ion etching treatment. Particularly, the ashing in step S103 is considered to be effective in decolorizing the colorant in the frosted portion 202. As a result of the reactive ion etching treatment according to the present embodiment, since a portion that is lightly colored is the surface of the frosted portion 402, when the frosted portion 402 is viewed from a back surface, the frosted portion 402 maintains the coloring of the frosted portion 202 of the glass slide 201 prepared for manufacturing. That is, coloring of the frosted portion 402 when viewed from the side on which the frosted portion 402 is formed is lighter than coloring of the frosted portion 402 when viewed from a side opposite to the surface on which the frosted portion 402 is formed. Therefore, based on a comparison of the frosted portion 402 viewed from both sides, it can be more clearly identified that the microscope slide is subjected to the reactive ion etching treatment according to the present embodiment.

When adhesiveness of paraffin-embedded sections of mouse liver is compared between the glass slide manufactured by the method according to the present embodiment and a glass slide coated with aminosilane, on the glass slide manufactured by the method of the present embodiment, the section can be prevented from peeling off similar to the glass slide coated with the aminosilane. Effect of preventing peeling is realized by applying processes of deparaffinization, hydrophilization, H&E staining, dehydration, and encapsulation. The contact angle of the glass slide coated with the aminosilane to water is approximately 25 to 60 degrees. Therefore, on the glass slide coated with the aminosilane, due to hydrophobicity, there is no water at the paraffin 501 around the section during extension, and the section is likely to have wrinkles. On the contrary, on the microscope slide obtained by the manufacturing method according to the present embodiment, the microscope slide can hold water around the paraffin 501 around the section due to having the high hydrophilicity, so that extension is easily performed and the section is less likely to have wrinkles. As described above, the microscope slide according to the present embodiment is suitable for attaching the section. Further, in the manufacturing method according to the present embodiment, since the surface of the glass slide prepared as the substrate is etched, no additional material is required to improve the adhesiveness and hydrophilicity.

In the present embodiment, the glass slide 201 is prepared as the silicon dioxide substrate, but instead of the glass slide 201, a quartz glass substrate, a cover glass or the like can be prepared. For example, instead of the glass slide 201, a cover glass having a length and width of 18 mm and a thickness of 0.15 mm can be used as a substrate to be prepared. As described above, instead of the glass slide 201, when a substrate having a size, in which a length is equal to or less than 76 mm, a width is equal to or less than 26 mm, and a thickness is equal to or less than 1 mm, is used for manufacturing the microscope slide according to the present embodiment, by mounting the manufactured microscope slide on a holder having a length of 76 mm, a width of 26 mm, and a thickness of 1 mm, which are a size of a general glass slide, observation of the placed section can be facilitated.

After placing a glass wafer of silicon dioxide on the lower electrode 303b as a substrate in step S101 and performing the treatment by the RIE apparatus 301 in above-described steps S102 and S103, by cutting the treated wafer with a dicing saw and cutting out the treated wafer into chips, a microscope slide can be obtained with the chips in a desired size. Accordingly, microscope slides suitable for mass manufacture can be obtained. FIG. 32 shows a schematic view of a wafer as an example. A glass wafer 3201 treated by the RIE apparatus 301 in above-described steps S102 and S103 is cut with the dicing saw along vertical and horizontal scribe lines 3202. Each chip 3203 cut out by performing cutting to be a microscope slide includes the above-described resin frosted portion 3204 on the surface subjected to the treatment performed by the RIE apparatus 301 in the above-described steps S102 and S103. The frosted portion 3204 can be formed by printing a resin film on one side in advance by urethane printing or the like along the scribe line 3202 on the wafer to be prepared, and placing the wafer in step S101 so that a surface opposite to the printed surface faces the lower electrode 303b. Alternatively, the frosted portion 3204 can be obtained by cutting out each chip 3203 by performing cutting with the dicing saw after the resin film is printed along the scribe line 3202 by performing the urethane printing or the like after step S103. Alternatively, the frosted portion 3204 can be formed by forming the resin film on each chip 3203 by performing the urethane printing or the like after each chip 3203 is cut out by performing cutting with the dicing saw. By setting a length of one side of each chip 3203, for example, a length of a long side to be 26 mm, it is possible to use a general dyeing bottle for glass slide or the like and improve workability. By setting a size of each chip 3203 that becomes a microscope slide to be the size in which the length is equal to or less than 76 mm, the width is equal to or less than 26 mm, and the thickness is equal to or less than 1 mm, the manufactured microscope slide is mounted on the holder having the length of 76 mm, the width of 26 mm, and the thickness of 1 mm, which are the size of the general glass slide, so that the observation of the placed section can be facilitated.

In the present embodiment, an example of attaching a paraffin-embedded section of an animal tissue is shown, but the microscope slide according to the present embodiment provides good adhesiveness even in a frozen section of a pea which is a plant sample. The invention can also be applied to attachment of cells such as yeast and stem cells to a surface of a substrate and attachment of resin-embedded sections to microscope slides.

In the present embodiment, in step S102, the $CHF_3$ gas is introduced into the chamber 302 of the RIE apparatus 301 to etch the silicon dioxide, which is the main component of the glass slide 201, with the reactive ions, but another fluorine-based gas can be also introduced. For example, a gas in which $H_2$ is mixed with $CF_4$ of fluorocarbon can be used instead of the $CHF_3$ gas. Besides, the fluorocarbons such as $C_2F_6$, $C_3F_8$, $C_4F_8$, and $C_5F_8$ can be used as the etching gas. The RIE apparatus is used in the present embodiment, but another dry etching apparatus can also be used.

In the present embodiment, the frosted portion 202 obtained by performing the color urethane printing is shown, but when frosting is not necessary, resin containing the colorant without containing a frosting agent can also be printed during the color urethane printing. When the frosted portion 202 is obtained by shaving a glass to roughen the surface, no change in coloring due to the reactive ion etching can be seen, but by performing the reactive ion etching treatment according to the present embodiment on the side including the frosted portion, the surface that is subjected to the reactive ion etching treatment according to the present embodiment can be specified.

Second Embodiment

The second embodiment of the invention will be described with reference to FIGS. 6 to 11. The present embodiment is different from the above-described first embodiment in that a silane-coated glass slide is prepared as a substrate, a region for performing the reactive ion etching is limited, and alignment markers used when observing or analyzing is performed with a plurality of apparatuses are formed. Here, a combination of the plurality of apparatuses is, for example, a combination of a scanning electron microscope (SEM) and a fluorescence microscope (FOM), or a combination of the SEM and a confocal laser microscope (CLM). With these combinations, for example, an image observed morphologically with high resolution by the SEM, which is a charged particle beam device, and an image observed with fluorescence by the FOM or the CLM, which is the optical microscope, are superimposed, so that the observing or the analyzing can be performed.

FIG. 6 is a flow chart of a manufacturing method of the microscope slide according to the embodiment of the invention. In step S601 in FIG. 6, a glass slide 701 shown in FIG. 7 is prepared and placed in the chamber 302 of the RIE apparatus 301. Specifically, similarly to the first embodiment, the glass slide 701 is placed so that a side not including a frosted portion 702 faces the lower electrode 303b. Accordingly, a side including the frosted portion 702 is dry-etched. Here, the glass slide 701 contains the silicon dioxide as the main component.

A surface of the glass slide 701 is coated with silane. In the present embodiment, the surface of the glass slide 701 is coated with 3-aminopropyltrimethoxysilane which is a silane coupling agent having an amino group. Similarly to the first embodiment, the glass slide 701 includes the frosted portion 702 on one surface. The frosted portion 702 is colored. The frosted portion 702 is colored, for example, pink.

An alignment marker 703-1 and an alignment marker 703-2 are provided on the surface of the glass slide 701 on a side where the frosted portion 702 is provided. The alignment marker 703-1 and the alignment marker 703-2 are respectively provided with numbers "1" and "2" for specifying the markers. The alignment marker 703-1 and the alignment marker 703-2 can be provided on the surface of the glass slide 701 on the side where the frosted portion 702 is provided by performing, for example, laser marking, focused ion beam (FIB) etching, or FIB material deposition. For example, the alignment marker 703-1 and the alignment marker 703-2 can be formed by being printed with resin while the frosted portion 702 is printed with the resin such as color urethane. Alternatively, the alignment marker 703-1 and the alignment marker 703-2 are formed using a fluorescent material, so that the alignment marker 703-1 and the alignment marker 703-2 can also be suitable for alignment in an image observed with fluorescence.

Further, as shown in FIG. 8, a mask member 801 is disposed on the glass slide 701 so as to cover a part of the frosted portion 702, the alignment marker 703-1, and the alignment marker 703-2. By covering a part of the surface of the glass slide 701 which is the substrate prepared with the mask member 801, a region into which the surface shape of the unevenness described in the first embodiment is introduced is limited. The mask member 801 can be formed of, for example, a plate of polytetrafluoroethylene (PTFE). Alternatively, the mask member 801 can be formed of a sheet of polydimethylsiloxane (PDMS) which is transparent silicone rubber. By forming the mask member 801 with the sheet of PDMS, a jig for fixing the glass slide 701 and the mask member 801 is not necessary due to self-adsorption action of the sheet of PDMS. Since the sheet of PDMS can be easily cut, the mask member 801 can be easily formed in any shape.

Next, in step S602, in order to remove the silane coat on a part of the glass slide 701 that is not covered with the mask member 801, the oxygen gas is introduced into the chamber 302 of the RIE apparatus 301, the high-frequency power is applied between the upper electrode 303a and the lower electrode 303b to generate the plasma, and ashing is performed on the part of the surface of the glass slide 701 that is not covered with the mask member 801. Ashing conditions in step S602 are, for example, to introduce the oxygen gas, 0.5 W/cm², 40 Pa, and to set the ashing time to 10 minutes.

In following step S603, similarly to the first embodiment, the $CHF_3$ gas is introduced as the etching gas, the plasma is generated between the upper electrode 303a and the lower electrode 303b, and the part of the surface of the glass slide 701 that is not covered with the mask member 801 is etched with the reactive ions.

Next, in step S604, similarly to the first embodiment, in order to remove a residue left on the surface of the glass slide 701, the oxygen gas is introduced into the chamber 302 of the RIE apparatus 301, the plasma is generated between the upper electrode 303a and the lower electrode 303b, and ashing is performed on the surface of the glass slide 701 etched in step S603. After the processing in step S604, the mask member 801 is removed from the microscope slide.

As described above, the glass slide which is the microscope slide according to the present embodiment can be manufactured. FIG. 9 shows a glass slide 901 manufactured according to the present embodiment. In the glass slide 901 manufactured according to the present embodiment, as a result of being etched with the reactive ion, unevenness is introduced in a region 903a of the surface that is not covered with the mask member 801 in the same manner as the first embodiment. Similarly to the first embodiment, the region 903a etched with the reactive ions shows high hydrophilicity with a contact angle to water of approximately 10 degrees or less. On the other hand, since the silane coat is maintained by the 3-aminopropyltrimethoxysilane, a contact angle to water in a region 903b on the surface that is covered with the mask member 801 is larger than the contact angle to water in the region 903a. The glass slide 901 of the microscope slide according to the present embodiment includes a boundary 904 having wettability for water between the region 903b on which the silane coat is maintained and that shows hydrophobicity and the region 903a that is dry-etched and shows hydrophilicity. After the entire surface of the substrate is treated with a silane coating, which is a wet process easy to be applied uniformly, a region for placing the section is formed by performing a dry etching process in which a desired region that can be processed easily by performing a mask process, so that the microscope slide according to the present embodiment can be manufactured with good reproducibility.

A frosted portion 902a that is not covered with the mask member 801 is less colored than the frosted portion 702 of the glass slide 701 prepared for manufacturing as a result of the above-described treatment performed with the reactive ions, as in the first embodiment. Since the frosted portion 902a is lightly colored, it can be identified that the glass slide is subjected to the above-described reactive ion etching treatment. Since the frosted portion 902b that is covered with the mask member 801 maintains original coloring, the frosted portion 902b can be visually identified from the frosted portion 902a. In this way, by masking a part of the colored frosted portion, it can be more easily identified that the microscope slide is subjected to the above-described reactive ion etching treatment.

FIG. 10 shows how a section 1002 floated on a water surface 1001 is placed on the glass slide 901. A position corresponding to the boundary 904 in FIG. 9 is indicated by a dashed arrow 1003. The water surface 1001 rises to a position of the arrow 1003 by surface tension due to the high hydrophilicity of the region 903a and a difference in the hydrophilicity between the region 903a and the region 903b on which the silane coat is maintained. Accordingly, regardless of skill of a worker, the position of the arrow 1003 becomes a target when the section 1002 is moved in a direction of an arrow 1005, and as shown in FIG. 11, the tissue section 1002 embedded with paraffin 1101 can be placed at a desired position on the glass slide 901 with the good reproducibility. In the present embodiment, since the alignment marker 703-1 and the alignment marker 703-2 are formed on the region 903b further along the boundary 904, a position of an observation region can be aligned between different microscope observations using the alignment marker 703-1 and the alignment marker 703-2. For example, an image morphologically observed with a transmission microscope, an epi-illumination microscope, or a phase contrast microscope, which is the optical microscope, or the image morphologically observed with high resolution by the SEM, which is the charged particle beam device, and the image observed with fluorescence by the FOM or the CLM, which is the optical microscope, can be easily superimposed, so that the observing or the analyzing can be performed.

In the present embodiment, the example in which the 3-aminopropyltrimethoxysilane is used for the silane coating of the prepared glass slide 701 is shown, but for example, using octadecyltrimethoxysilane, which is a silane coupling agent having an alkyl group, for the silane coating, the contact angle to water of the region 903b in which the silane coat is maintained can further be made larger than that in the case where 3-aminopropyltrimethoxysilane is used, so as to make the region 903b water repellent. By making the region 903b in which the silane coat is maintained water repellent, the boundary 904 between the region 903a and the region 903b can be more easily visually recognized from the water surface. Instead of preparing the silane-coated glass slide, even by preparing a substrate whose surface is coated with a polymer such as polyethyleneimine or polylysine, as described above, the region 903a etched with the reactive ions and the surface where polymer coating such as polyethyleneimine or polylysine is maintained by the mask member 801 can have a hydrophilicity difference, and the observing or the analyzing can be performed depending on the visual recognition using the surface tension of the boundary 904 and the superimposition of images using the alignment marker 703-1 and the alignment marker 703-2.

Third Embodiment

The third embodiment of the invention will be described with reference to FIGS. 12 to 16. The present embodiment is different from the above-described second embodiment mainly in a direction in which the mask member is disposed.

A flow of a manufacturing method of a microscope slide according to the present embodiment will also be described with reference to FIG. 6 of the second embodiment. In the present embodiment, in step S601, a glass slide 1201 shown in FIG. 12 is prepared and placed in the chamber 302 of the RIE apparatus 301. Specifically, similarly to the first embodiment, the glass slide 1201 is placed so that a side not including a frosted portion 1202 faces the lower electrode 303b. Accordingly, a side including the frosted portion 1202 is dry-etched. Here, the glass slide 1201 contains the silicon dioxide as the main component.

Similarly to the second embodiment, a surface of the glass slide 1201 is coated with the silane. In the present embodiment, the surface of the glass slide 1201 is coated with the 3-aminopropyltrimethoxysilane. Similarly to the first embodiment, the glass slide 1201 includes the frosted portion 1202 on one surface, and the frosted portion 1202 is colored. The frosted portion 1202 is colored, for example, pink.

On the surface of the glass slide 1201 on a side on which the frosted portion 1202 is provided, an alignment marker row 1203 is provided in a region surrounded by a two-dot chain line. The alignment marker row 1203 can be provided on the surface of the glass slide 1201 on the side on which the frosted portion 1202 is provided by performing, for example, the laser marking, the FIB etching, or the FIB material deposition. For example, the alignment marker row 1203 can be formed by being printed with resin while the frosted portion 1202 is printed with the resin such as the color urethane. Alternatively, the alignment marker row 1203 is formed using the fluorescent material, so that the alignment marker row 1203 can be suitable for alignment in the image observed with fluorescence.

Further, as shown in FIG. 13, a mask member 1301 is disposed on the glass slide 1201 so as to cover apart of the frosted portion 1202 and the alignment marker row 1203 similarly to the above-described second embodiment. Here, using one of sides of the mask member 1301, a boundary between a masked portion and an unmasked portion is made linear.

Next, in step S602, similarly to the second embodiment, in order to remove the silane coat on a part of the glass slide 1201 that is not covered with the mask member 1301, the oxygen gas is introduced into the chamber 302 of the RIE apparatus 301, the plasma is generated between the upper electrode 303a and the lower electrode 303b, and ashing is performed on a surface of the part of the surface of the glass slide 1201 that is not covered with the mask member 1301.

In following step S603, similarly to the first embodiment, the $CHF_3$ gas is introduced, the plasma is generated between the upper electrode 303a and the lower electrode 303b, and the part of the surface of the glass slide 1201 that is not covered with the mask member 1301 is etched with the reactive ions.

Next, in step S604, similarly to the first embodiment, in order to remove a residue left on the surface of the glass slide 1201, the oxygen gas is introduced into the chamber 302 of the RIE apparatus 301, the plasma is generated between the upper electrode 303a and the lower electrode 303b, and ashing is performed on the surface of the glass slide 1201 etched in step S603. After the processing in step S604, the mask member 1301 is removed from the microscope slide.

As described above, the glass slide which is the microscope slide according to the present embodiment can be manufactured. FIG. 14 shows a glass slide 1401 manufactured according to the present embodiment. In the glass slide 1401 manufactured according to the present embodiment, as a result of being etched with the reactive ion, unevenness is introduced in a region 1403a that is not covered with the mask member 1301 in the same manner as the first embodiment. Similarly to the first embodiment, the region 1403a etched with the reactive ions shows high hydrophilicity with a contact angle to water of approximately 10 degrees or less. On the other hand, since the silane coat is maintained by the 3-aminopropyltrimethoxysilane, a contact angle to water in a region 1403b that is covered with the mask member 1301 is larger than the contact angle to water in the region 1403a. A frosted portion 1402a that is not covered with the mask member 1301 is less colored than the frosted portion 1202 of the glass slide 1201 prepared for manufacturing as a result of the above-described treatment with the reactive ions. Since the frosted portion 1402a is lightly colored, it can be identified that the glass slide is subjected to the above-described reactive ion etching treatment. Since the frosted portion 1402b that is covered with the mask member 1301 maintains original coloring, the frosted portion 1402b can be visually identified from the frosted portion 1402a. Further, a boundary 1404 between the region 1403a etched with the reactive ions and the region 1403*b* that is covered with the mask member 1301 can be visually inferred from a boundary between the frosted portion 1402*a* and the frosted portion 1402*b*.

FIG. 15 shows how continuous sections 1502 floated on a water surface 1501 is placed on the glass slide 1501. A position corresponding to a boundary 1404 in FIG. 14 is indicated by a dashed arrow 1503. Similarly to the second embodiment, the water surface 1501 rises to a position of the arrow 1503 by surface tension due to the high hydrophilicity of the region 1403*a* and a difference in the hydrophilicity between the surface 1403*a* and the region 1403*b* on which the silane coat is maintained. Accordingly, regardless of skill of a worker, the position of the arrow 1503 becomes a target when the continuous sections 1502 are moved in a direction of an arrow 1505, and as shown in FIG. 16, the continuous sections 1502 can be placed at a desired position on the glass slide 1401 with the good reproducibility. In the present embodiment, since the alignment marker row 1203 is formed on the region 1403*b* further along the boundary 1404, a position of an observation region can be aligned between different microscope observations using the alignment marker row 1203. For example, the image morphologically observed by the transmission microscope, the epi-illumination microscope, or the phase contrast microscope, which is the optical microscope, or the image morphologically observed with high resolution by the SEM, which is the charged particle beam device, and the image observed with fluorescence by the FOM or the CLM, which is the optical microscope, can be easily superimposed, so that the observing or the analyzing can be performed for a desired section of the continuous sections 1502.

In the present embodiment, the example in which the 3-aminopropyltrimethoxysilane is used for the silane coating of the substrate to be prepared is shown, but in order to attain the water repellency as in the second embodiment, the octadecyltrimethoxysilane, which is the silane coupling agent having the alkyl group, can be used.

Fourth Embodiment

The fourth embodiment of the invention is different from each of the above-described embodiments mainly in that the substrate to be prepared is formed with a layer to be etched with the above-described reactive ions. FIG. 17(*a*) is a schematic side-surface view of the substrate showing an example in which a substrate 1701 to be prepared includes an indium tin oxide (ITO) layer 1702. The substrate 1701 includes the ITO layer 1702 on an upper surface of a silicon dioxide glass plate. Here, a thickness of the ITO layer 1702 to be prepared is thicker than a thickness of the ITO layer 1702 etched with the reactive ions to be described later. Therefore, since the ITO layer 1702 remains even after unevenness is introduced to the surface by performing etching with the reactive ions according to the present embodiment, conductivity is ensured, and it is possible to facilitate observation performed by SEM, which is the charged particle beam device, of a section placed on the ITO layer 1702 remaining on the manufactured microscope slide.

In the present embodiment, in the manufacturing method described with reference to FIGS. 1 and 6 of the above-described embodiments, the substrate 1701 is placed so that a side opposite to a side on which the ITO layer 1702 is formed faces the lower electrode 303*b*. Instead of introducing the $CHF_3$ gas into the chamber 302 of the RIE apparatus 301, a hydrogen iodide (HI) gas or a $CH_4$ gas and an $H_2$ gas are introduced as the etching gas, so that the ITO layer 1702 is etched with the reactive ions, and a surface shape of unevenness is introduced onto the ITO layer 1702 as in the first embodiment.

In the present embodiment, the substrate 1701 is formed by forming the ITO layer 1702 on a glass plate, but for example, a glass wafer can be used as the glass plate.

Instead of the ITO layer 1702 according to the present embodiment, FIG. 17(*b*) shows a schematic side-surface view of a substrate according to a modification in which a substrate 1703 including a silicon nitride layer 1704 thicker than a thickness of etching with the reactive ion on the silicon dioxide glass plate is prepared. As the etching gas for etching the silicon nitride layer 1704, for example, a fluorine-based gas is used to etch the silicon nitride layer with the reactive ions to introduce the same surface shape of the unevenness as the first embodiment, so that the silicon nitride layer remaining after the etching can impart chemical resistance to the microscope slide. Further, as shown in FIG. 17(*b*), the substrate 1703 includes a silicon nitride layer 1705 on a side opposite to the side including the silicon nitride layer 1704, so that the microscope slide can have higher chemical resistance. A thickness of the silicon nitride layer 1705 can be, for example, approximately the same as the thickness of the silicon nitride layer 1704 before being etched.

Fifth Embodiment

The fifth embodiment of the invention will be described with reference to FIG. 18. In the present embodiment, an observation and analysis method using the alignment marker shown in each embodiment will be described. FIG. 18 is a diagram showing an observation system 1801 used in the present embodiment.

The observation system 1801 includes a scanning electron microscope (SEM) 1802, a confocal laser microscope (CLM) 1803, a fluorescence microscope (FOM) 1804, and a server 1805. The SEM 1802, the CLM 1803, the FOM 1804, and the server 1805 each include an interface 1806, and are connected to one another via a network 1807.

The SEM 1802, the CLM 1803, and the FOM 1804 each include an XY stage 1808 that allows an observation position or an analysis position of a sample to be changed and a stage controller 1809 that controls an operation of the XY stage 1808. A positional relationship between the alignment marker according to the above-described embodiment and an observation target or an analysis target on a section can be imported into the stage controller 1809, and alignment can be performed at the XY stage 1808 based on the imported positional relationship.

The server 1805 includes a central processing unit (CPU) 1810, a memory 1811, and a storage 1812 which are connected to a bus 1813. The positional relationships imported in each stage controller 1809 are transferred to the server 1805, and the server 1805 stores the imported positional relationships in the storage 1812. Each positional relationship is stored in the storage 1812 in association with information of a sample to be observed or analyzed and acquired image data or analysis result. The positional relationship stored in the storage 1812 is called by the SEM 1802, the CLM 1803, or the FOM 1804, image capturing or analysis is performed for reproducing the called positional relationship, and the information of the sample to be observed or analyzed, newly acquired image data or analysis result and the reproduced positional relationship are stored in the storage 1812.

The server 1805 can reproduce the positional relationship with the same sample, superimpose the captured images, and output the superimposed images. Accordingly, for example, a section image morphologically observed with high resolution by the SEM, which is the charged particle beam device, and a section image observed with fluorescence by the FOM or the CLM, which is the optical microscope, can be easily superimposed, so that the observing or the analyzing can be performed.

In the present embodiment, an example in which the SEM 1802, the CLM 1803, and the FOM 1804 are connected to the server 1805 is shown, but the transmission microscope, the epi-illumination microscope, a phase contrast microscope, or the like can be similarly connected to the server 1805.

Sixth Embodiment

The sixth embodiment of the invention will be described with reference to FIGS. 20 to 23. The present embodiment is different from the above-described second embodiment mainly in that a structure is provided in both a longitudinal direction and a lateral direction of the glass slide of the mask member.

A flow of a manufacturing method of a microscope slide according to the present embodiment will also be described with reference to FIG. 6 of the second embodiment. In the present embodiment, in step S601, a glass slide 2001 shown in FIG. 20 is prepared and placed in the chamber 302 of the RIE apparatus 301. Specifically, similarly to the first embodiment, the glass slide 2001 is placed so that a side not including a frosted portion 2002 faces the lower electrode 303*b*. Accordingly, a side including the frosted portion 2002 is dry-etched. Here, the glass slide 2001 contains the silicon dioxide as the main component.

Similarly to the second embodiment, a surface of the glass slide 2001 is coated with the silane. In the present embodiment, the surface of the glass slide 2001 is coated with the 3-aminopropyltrimethoxysilane. Similarly to the first embodiment, the glass slide 2001 includes the frosted portion 2002 on one surface. The frosted portion 2002 is colored. The frosted portion 2002 is colored, for example, pink. On the surface of the glass slide 2001 on a side on which the frosted portion 2002 is provided, alignment markers 2003-1 to 2003-4 are provided similarly to the second embodiment.

Further, as shown in FIG. 21, a mask member 2101 is disposed on the glass slide 2001 so as to cover apart of the frosted portion 2002 and the alignment markers 2003-1 to 2003-4 similarly to the above-described second embodiment. Here, one side of the mask member 2101 on the frosted portion 2002 and one side of the mask member 2101 on the glass are disposed on a straight line as shown in FIG. 21.

Next, in step S602, similarly to the second embodiment, in order to remove the silane coat on a part of the glass slide 2001 that is not covered with the mask member 2101, the oxygen gas is introduced into the chamber 302 of the RIE apparatus 301, the plasma is generated between the upper electrode 303*a* and the lower electrode 303*b*, and ashing is performed on a surface of the part of the surface of the glass slide 2001 that is not covered with the mask member 2101.

In following step S603, similarly to the first embodiment, the CHF$_3$ gas is introduced, the plasma is generated between the upper electrode 303*a* and the lower electrode 303*b*, and the part of the surface of the glass slide 2001 that is not covered with the mask member 2101 is etched with the reactive ions.

Next, in step S604, similarly to the first embodiment, in order to remove a residue left on the surface of the glass slide 2001, the oxygen gas is introduced into the chamber 302 of the RIE apparatus 301, the plasma is generated between the upper electrode 303*a* and the lower electrode 303*b*, and ashing is performed on the surface of the glass slide 2001 etched in step S603. After the processing in step S604, the mask member 2101 is removed from the microscope slide.

As described above, the glass slide which is the microscope slide according to the present embodiment can be manufactured. FIG. 22 shows a glass slide 2201 manufactured according to the present embodiment. In the glass slide 2201 manufactured according to the present embodiment, as a result of being etched with the reactive ion, unevenness is introduced in a region 2203*a* that is not covered with the mask member 2101 in the same manner as the first embodiment. Similarly to the first embodiment, the region 2203*a* etched with the reactive ions shows high hydrophilicity with a contact angle to water of approximately 10 degrees or less. On the other hand, since the silane coat is maintained by the 3-aminopropyltrimethoxysilane, a contact angle to water in a region 2203*b* that is covered with the mask member 2101 is larger than the contact angle to water in the region 2203*a*. A frosted portion 2202*a* that is not covered with the mask member 2101 is less colored than the frosted portion 2002 of the glass slide 2001 prepared for manufacturing as a result of the above-described reactive ion etching treatment. Since the frosted portion 2202*a* is lightly colored, it can be identified that the glass slide is subjected to the above-described reactive ion etching treatment. Since a frosted portion 2202*b* that is covered with the mask member 2101 maintains original coloring, the frosted portion 2202*b* can be visually identified from the frosted portion 2202*a*. Further, similarly to the third embodiment, a boundary 2204 between the region 2203*a* etched with the reactive ions and the region 2203*b* that is covered with the mask member 2101 can be visually inferred from a boundary between the frosted portion 2202*a* and the frosted portion 2202*b*.

In the present embodiment, it becomes easy to guide a section floated on a water surface to the region 2203*a* which is easily wet since the region 2203*a* has hydrophilicity higher than that of the peripheral region 2203*b*. Accordingly, regardless of skill of a worker, as shown in FIG. 23, a section 2301 can be placed at the region 2203*a* on the glass slide 2201 with good reproducibility. In the present embodiment, since the alignment markers 2003-1 to 2003-4 are formed on the region 2203*b* further along the boundary 2204, a position of an observation region can be aligned between different microscope observations using the alignment markers 2003-1 to 2003-4. For example, the image morphologically observed by the transmission microscope, the epi-illumination microscope, or the phase contrast microscope, which is the optical microscope, or the image morphologically observed with high resolution by the SEM, which is the charged particle beam device, and the image observed with fluorescence by the FOM or the CLM, which is the optical microscope, can be easily superimposed, so that the observing or the analyzing can be performed.

In the present embodiment, the example in which the 3-aminopropyltrimethoxysilane is used for the silane coating of the substrate to be prepared is shown, but in order to attain the water repellency as in the second embodiment, the octadecyltrimethoxysilane, which is the silane coupling agent having the alkyl group, can be used.

FIG. 30 shows a microscope slide 3001 manufactured by changing a shape of the mask member 2101 and changing a direction of the unmasked part. By changing the shape of the mask member 2101, in the microscope slide 3001, a longitudinal direction of an unmasked and reactive ion-etched region 2203a surrounded by a U-shaped boundary 2204 in a region 2203b that is masked and not subjected to the reactive ion etching is aligned with a longitudinal direction of the microscope slide 3001. In addition to the above, the microscope slide 3001 is also suitable for attaching the continuous sections.

Seventh Embodiment

The seventh embodiment of the invention will be described with reference to FIGS. 24 to 29. The present embodiment is different from the above-described second embodiment mainly in that an opening is provided on a mask member.

A flow of a manufacturing method of a microscope slide according to the present embodiment will also be described with reference to FIG. 6 of the second embodiment. In the present embodiment, in step S601, a glass slide 2401 shown in FIG. 24 is prepared and placed in the chamber 302 of the RIE apparatus 301. Specifically, similarly to the first embodiment, the glass slide 2401 is placed so that a side not including a frosted portion 2402 faces the lower electrode 303b. Accordingly, a side including the frosted portion 2402 is dry-etched. Here, the glass slide 2401 contains the silicon dioxide as the main component.

Similarly to the second embodiment, a surface of the glass slide 2401 is coated with the silane. In the present embodiment, the surface of the glass slide 2401 is coated with the 3-aminopropyltrimethoxysilane. Similarly to the first embodiment, the glass slide 2401 includes the frosted portion 2402 on one surface. The frosted portion 2402 is colored. The frosted portion 2402 is colored, for example, pink.

On the surface of the glass slide 2401 on a side on which the frosted portion 2402 is provided, alignment markers 2403-1 to 2403-8 are provided similarly to the first embodiment.

Further, as shown in FIG. 25, a mask member 2501 is disposed on the glass slide 2401 so as to cover a part of the frosted portion 2402 and the alignment markers 2403-1 to 2403-8 similarly to the above-described second embodiment.

Next, in step S602, in order to remove the silane coat on parts of the glass slide 2401 that are not covered with the mask member 2501, the oxygen gas is introduced into the chamber 302 of the RIE apparatus 301, the plasma is generated between the upper electrode 303a and the lower electrode 303b, and ashing is performed on surfaces of the parts of the surface of the glass slide 2401 that are not covered with the mask member 2501.

In following step S603, similarly to the first embodiment, the $CHF_3$ gas is introduced, the plasma is generated between the upper electrode 303a and the lower electrode 303b, and the parts of the surface of the glass slide 2401 that are not covered with the mask member 2501 are etched with the reactive ions.

Next, in step S604, similarly to the first embodiment, in order to remove a residue left on the surface of the glass slide 2401, the oxygen gas is introduced into the chamber 302 of the RIE apparatus 301, the plasma is generated between the upper electrode 303a and the lower electrode 303b, and ashing is performed on the surface of the glass slide 2401 etched in step S603. After the processing in step S604, the mask member 2501 is removed from the microscope slide.

As described above, the glass slide which is the microscope slide according to the present embodiment can be manufactured. FIG. 26 shows a glass slide 2601 manufactured according to the present embodiment. In the glass slide 2601 manufactured according to the present embodiment, as a result of being etched with the reactive ion, a surface shape of unevenness is introduced in a region 2603a that is not covered with the mask member 2501 in the same manner as the first embodiment. Similarly to the first embodiment, the region 2603a etched with the reactive ions shows high hydrophilicity with a contact angle to water of approximately 10 degrees or less. On the other hand, since the silane coat is maintained by the 3-aminopropyltrimethoxysilane, a contact angle to water in a region 2603b that is covered with the mask member 2501 is larger than the contact angle to water in the region 2603a. Therefore, in the present embodiment, the region 2603a on which the section is placed is surrounded by a region in which a contact angle to water is larger than that in the region 2603a. A frosted portion 2602a that is not covered with the mask member 2501 is less colored than the frosted portion 2402 of the glass slide 2401 prepared for manufacturing as a result of the above-described reactive ion treatment. Since the frosted portion 2602a is lightly colored, it can be identified that the glass slide is subjected to the above-described reactive ion etching treatment. Since frosted portions 2602b that are covered with the mask member 2501 maintain original coloring, the frosted portions 2602b can be visually identified from the frosted portions 2602a. Further, similarly to the third embodiment, a boundary 2604 between the region 2603a etched with the reactive ions and the region 2603b that is covered with the mask member 2501 can be visually inferred from a boundary between the frosted portion 2602a and the frosted portions 2602b.

In the present embodiment, for example, in the region 2603a that is subjected to the reactive ion etching treatment, water is preliminarily applied by utilizing the boundary 2604 having wettability for water, so that the section can be transferred from a transport tape of a thin-section slide-sample manufacturing apparatus and placed. FIG. 27 shows a state in which sections 2701 are placed on the four regions 2603a. A chemical solution is mounted in the region 2603a using the boundary 2604, so that it is possible to efficiently stain or label the section. Here, in the present embodiment, the example in which the 3-aminopropyltrimethoxysilane is used for the silane coating of the substrate to be prepared is shown, but in order to obtain the water repellency as in the second embodiment, the octadecyltrimethoxysilane, which is the silane coupling agent having the alkyl group, can be used. Accordingly, it can be easier to hold water in the region 2603a using the boundary 2604. Instead of hydrophobic coating such as silane coating on the substrate to be prepared in advance, a hydrophobic material is applied or printed to surround a region of a surface on which a surface shape of unevenness is introduced by performing the above-described reactive ion etching treatment, so that a coating having a contact angle to water larger than that of the surface is applied around a region on which a section of the surface is placed. On the surface, a surface shape of unevenness is introduced by performing the above-described reactive ion etching treatment.

Further, in the present embodiment, since the alignment markers 2603-1 to 2603-8 are formed on the region 2603b along the boundary 2604, a position of an observation region can be aligned between different microscope observations using the alignment markers 2603-1 to 2603-8. For example, the image morphologically observed by the transmission microscope, the epi-illumination microscope, or the phase contrast microscope, which is the optical microscope, or the image morphologically observed with high resolution by the SEM, which is the charged particle beam device, and the image observed with fluorescence by the FOM or the CLM, which is the optical microscope, can be easily superimposed, so that the observing or the analyzing can be performed.

In the present embodiment, an example of the paraffin-embedded section is shown, but as shown in FIG. 28, a resin-embedded section 2802 can also be attached to a desired position using the boundary 2604. As in a microscope slide 2801 shown in FIG. 28, by reducing an area of each of the regions 2603a in accordance with a size of a section, positional accuracy of placement of the section can be improved. On the contrary, as in a microscope slide 2901 shown in FIG. 29, by changing a shape of the mask member 2501 for a larger paraffin-embedded section 2902, the region 2603a surrounded by the region 2603b can be enlarged using the boundary 2604.

REFERENCE SIGN LIST

301: reactive ion etching (RIE) apparatus, 302: chamber, 302a: upper electrode, 303b: lower electrode, 401: glass slide, 402: frosted portion, 403: reactive ion-etched surface, 502: tissue section, 1802: scanning electron microscope (SEM), 1803: confocal laser microscope (CLM), 1804: fluorescence microscope (FOM)

The invention claimed is:

1. A manufacturing method of a microscope slide comprising:
   a first step of preparing a transparent substrate having a surface on which a colored resin film is partially formed;
   a second step of etching a first region that is at least a part of the surface of the substrate on which the resin film is formed, by etching with reactive ions etching a material of the substrate to introduce a surface shape including convex portions at a higher density than 25 per 1 $\mu m^2$ in a plan view;
   a third step of ashing at least a part of the resin film and the first region with oxygen reactive ions after the second step,
   wherein coloring of a part of the resin film to which ashing with the oxygen reactive ions has been performed is lighter than coloring of the resin film when viewed from a side opposite to the surface including the resin film.

2. The manufacturing method of the microscope slide according to claim 1,
   wherein a biological tissue section attached to the first region is prevented from peeling off without applying an additional material.

3. The manufacturing method of the microscope slide according to claim 1,
   wherein, on a surface of the first region in the second step, the etching with the reactive ions progresses more in a recessed region being a groove between the adjacent convex portions than the convex portion.

4. The manufacturing method of the microscope slide according to claim 3,
   wherein the substrate is a silicon oxide substrate,
   the reactive ions of the second step are obtained by introducing gas containing fluorine-based gas, and
   in the second step, the surface shape of unevenness irregularly filled with the convex portions is introduced by introducing surface roughness including the convex portions to a surface of the silicon oxide substrate.

5. The manufacturing method of the microscope slide according to claim 1,
   wherein the substrate to be prepared in the first step is a glass slide, and
   the resin film is a frosted portion.

6. The manufacturing method of the microscope slide according to claim 5,
   wherein the first region is provided in contact with an edge of the glass slide.

7. A manufacturing method of a microscope slide comprising:
   a first step of preparing a substrate;
   a second step of etching a first region that is at least a part of the surface of the substrate by etching with reactive ions to introduce a surface shape having convex portions at a higher density than 25 convex portions per 1 $\mu m^2$ in plan view,
   a third step of ashing the first region with oxygen reactive ion after the second step,
   wherein, on a surface of the first region in the second step, the etching with the reactive ions progresses more in a recessed region being a groove between the adjacent convex portions than in the convex portion.

8. The manufacturing method of the microscope slide according to claim 7,
   wherein the substrate is a silicon oxide substrate,
   the reactive ions of the second step are obtained by introducing gas containing fluorine-based gas, and
   in the second step, the surface shape of unevenness irregularly filled with the convex portions is introduced by introducing surface roughness including the convex portions to a surface of the silicon oxide substrate.

9. The manufacturing method of the microscope slide according to claim 7,
   wherein a biological tissue section attached to the first region is prevented from peeling off without applying an additional material.

* * * * *